United States Patent
Fujii

(10) Patent No.: US 12,542,600 B2
(45) Date of Patent: Feb. 3, 2026

(54) MITIGATION OF DEGRADATION OF INTERFERENCE-REDUCTION PERFORMANCE IN PROCESSING DELAY WHEN SWITCHING ANTENNAS IN HAPS MULTI-FEEDER LINKS

(71) Applicant: SoftBank Corp., Tokyo (JP)

(72) Inventor: Takafumi Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 478 days.

(21) Appl. No.: 18/016,463

(22) PCT Filed: Jul. 7, 2021

(86) PCT No.: PCT/JP2021/025690
§ 371 (c)(1),
(2) Date: Jun. 12, 2023

(87) PCT Pub. No.: WO2022/019125
PCT Pub. Date: Jan. 27, 2022

(65) Prior Publication Data
US 2024/0305360 A1 Sep. 12, 2024

(30) Foreign Application Priority Data

Jul. 22, 2020 (JP) .................................. 2020-125096

(51) Int. Cl.
*H04B 7/185* (2006.01)
*H04B 7/0456* (2017.01)
*H04B 7/06* (2006.01)

(52) U.S. Cl.
CPC ....... *H04B 7/18504* (2013.01); *H04B 7/0456* (2013.01); *H04B 7/0617* (2013.01); *H04B 7/06952* (2023.05)

(58) Field of Classification Search
CPC .. H04B 7/0408; H04B 7/0452; H04B 7/0456; H04B 7/0473; H04B 7/0617; H04B 7/2041; H04B 7/18504
(Continued)

(56) References Cited

U.S. PATENT DOCUMENTS

| | | |
|---|---|---|
| 11,133,858 B2 | 9/2021 | Fujii |
| 2016/0046387 A1 | 2/2016 | Frolov et al. |

(Continued)

FOREIGN PATENT DOCUMENTS

| | | |
|---|---|---|
| JP | 2020-036100 A | 3/2020 |
| JP | 2020-080459 A | 5/2020 |

OTHER PUBLICATIONS

Takafumi Fujii, A Study on Efficient Spectrum Utilization for Feeder Link Using Multiple Gateways in HAPS System, Japanese/Information and Co:f 1munication Engineering (Year: 2018).*

*Primary Examiner* — Harun Chowdhury
(74) *Attorney, Agent, or Firm* — Westborough IP Group, LLC

(57) ABSTRACT

It is to mitigate a deterioration of an interference reduction performance between multi-feeder links due to a weight-calculation processing delay, when a combination of plural antennas for feeder link (FL antenna) incorporated in an aerial-staying type communication relay apparatus and plural gateway (GW) stations changes. With respect to each of plural combination patterns in which combinations of plural FL antennas of relay communication station and the plural GW stations are different from each other, a system calculates and stores a weight corresponding to each of the plural GW stations, selects a calculation result of the weight of the combination pattern corresponding to the changed combination, when the combination of the plural FL antennas and the plural GW stations changes due to at least one of a rotation and movement of the communication relay appa- (Continued)

ratus, and suppresses an interference between the feeder links when transmitting and receiving signals between the relay communication station and the plural GW stations based on the selected calculation result of the weight of the combination pattern.

20 Claims, 28 Drawing Sheets

(58) Field of Classification Search
USPC .................... 370/316, 317; 455/13.3, 427
See application file for complete search history.

(56) References Cited

U.S. PATENT DOCUMENTS

| | | |
|---|---|---|
| 2019/0199428 A1 | 6/2019 | Regunathan et al. |
| 2021/0152238 A1* | 5/2021 | Krause ................ H04B 7/2041 |

* cited by examiner

MITIGATION OF DEGRADATION OF INTERFERENCE-REDUCTION PERFORMANCE IN PROCESSING DELAY WHEN SWITCHING ANTENNAS IN HAPS MULTI-FEEDER LINKS

TECHNICAL FIELD

The present invention relates to a mitigation of deterioration of interference-reduction performance in a processing delay when switching antennas in a multi-feeder link of an aerial-floating type radio communication apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (see, for example, Patent Literature 1). A communication line in the aerial-floating type communication relay apparatus is configured with a feeder link between the communication relay apparatus and a gateway (GW) station on a mobile communication network side, and a service link between the communication relay apparatus and a terminal apparatus.

The present applicant has proposed a communication system capable of improving an effective use of the frequency of a feeder link of an aerial-floating type communication relay apparatus (hereinafter referred to as "upper-airspace relay apparatus") (see Patent Literature 2). The communication system is provided with plural gateway stations for performing a spatial-division multiplex communication that transmits and receives relay signals different from each other at a same frequency in the feeder link to and from the upper-airspace relay apparatus. According to the communication system, it is possible to reduce an interference between the plural feeder links in a feeder link communication between the upper-airspace relay apparatus and the plural gateway stations, by calculating a weight based on a positional relationship between plural antennas for feeder link of the upper-airspace relay apparatus and the plural gateway stations, and using the calculated weight.

CITATION LIST

Patent Literature

Patent Literature 1: U.S. Patent Application Publication No. 2016/0046387
Patent Literature 2: Japanese Unexamined Patent Publication No. 2020-036100

SUMMARY OF INVENTION

Technical Problem

As a result of diligent research on the interference reduction performance between feeder links in the aforementioned communication system, the present inventor has found that there are the following problems to be further improved. That is, when the combination of plural antennas for feeder link of the upper-airspace relay apparatus rotating and moving in the upper airspace and the antennas of plural gateway stations changes, it is found that the interference reduction performance between plural feeder links using weights may deteriorate.

Solution to Problem

A system according to an aspect of the present invention is a system provided with an aerial-staying type communication relay apparatus that have a relay communication station for relaying a radio communication of a terminal apparatus and plural antennas for feeder link, and plural gateway stations that are time-synchronized with each other and transmit and receive relay signals different from each other at a same frequency in a feeder link between the relay communication station of the aerial-staying type communication relay apparatus. The system comprises: means for calculating and storing a weight for suppressing an interference between feeder links with respect to each of plural combination patterns of the plural antennas for feeder link and the plural gateway stations; means for selecting a calculation result of the weight of the combination pattern, which corresponds to the combination after changing, from the calculation results of the weights of the plural combination patterns, when the combination of the plural antennas for feeder link and the plural gateway stations changes due to at least one of the rotation and movement of the aerial-staying type communication relay apparatus; and means for suppressing an interference between feeder links when transmitting and receiving relay signals between the relay communication station and the plural gateway stations based on the selected calculation result of the weight of the combination pattern.

In the foregoing system, the system may comprise means for tracking a gateway station of a communication destination of a feeder link by changing an angle of a directional beam of each of the plural antennas for feeder link, and means for switching the gateway station of the communication destination of the feeder link with which each of the plural antennas for feeder link communicates, when an amount of change in the angle of at least one of the directional beams of the plural antennas for feeder link becomes larger than a predetermined threshold value.

In the foregoing system, the system may estimate, with respect to each of the plural combination patterns, propagation path responses between the plural antennas for feeder link and the plural gateway stations based on reception results of plural pilot signals transmitted and received between the plural antennas for feeder link and the plural gateway stations, and calculate plural weights respectively corresponding to the plural gateway stations based on the plural propagation path responses.

In the foregoing system, the system may suppress interferences between feeder links in plural forward links for transmitting relay signals from the plural gateway stations to the relay communication station, based on the selected calculation result of the weight of the combination pattern.

In the foregoing system, the system may suppress interferences between feeder links in plural reverse links for transmitting relay signals from the relay communication station to the plural gateway stations, based on the selected calculation result of the weight of the combination pattern.

A relay communication station according to another aspect of the present invention is a relay communication station that is incorporated in an aerial-staying type communication relay apparatus and relays radio communication of a terminal apparatus. The relay communication station comprises: a feeder-link communication section for transmitting and receiving relay signals different from each other at a same frequency in feeder links between the relay communication station and plural gateway stations that are time-synchronized with each other; and an interference suppression section for suppressing interference between plural feeder links that are formed between the relay communication station and the plural gateway stations. The interference suppression section calculates and stores a weight for suppressing an interference between feeder links with respect to each of plural combination patterns of the plural antennas for feeder link and the plural gateway stations, selects a calculation result of the weight of the combination pattern, which corresponds to the combination after changing, from the calculation results of the weights of the plural combination patterns, when the combination of the plural antennas for feeder link and the plural gateway stations changes due to at least one of the rotation and movement of the aerial-staying type communication relay apparatus, and suppresses an interference between feeder links when transmitting and receiving relay signals between the relay communication station and the plural gateway stations based on the selected calculation result of the weight of the combination pattern.

In the foregoing relay communication station, the relay communication station may comprise means for tracking a gateway station of a communication destination of a feeder link by changing an angle of a directional beam of each of the plural antennas for feeder link, and means for switching the gateway station of the communication destination of the feeder link with which each of the plural antennas for feeder link communicates, when an amount of change in the angle of at least one of the directional beams of the plural antennas for feeder link becomes larger than a predetermined threshold value.

In the foregoing relay communication station, the interference suppression section may estimate, with respect to each of the plural combination patterns, propagation path responses between the plural antennas for feeder link and the plural gateway stations based on reception results of plural pilot signals transmitted and received between the plural antennas for feeder link and the plural gateway stations, and calculate plural weights respectively corresponding to the plural gateway stations based on the plural propagation path responses.

In the foregoing relay communication station, the interference suppression section may suppress interferences between feeder links in plural forward links for transmitting relay signals from the plural gateway stations to the relay communication station, based on the selected calculation result of the weight of the combination pattern.

In the foregoing relay communication station, the interference suppression section may suppress interference between feeder links in plural reverse links for transmitting relay signals from the relay communication station to the plural gateway stations, based on the selected calculation result of the weight of the combination pattern.

An aerial-staying type communication relay apparatus according to yet another aspect of the present invention has any one of the above-described relay communication stations.

An interference suppression method according to yet another aspect of the present invention is an interference suppression method of feeder link between a relay communication station that is incorporated in an aerial-staying type communication relay apparatus and relays a radio communication of a terminal apparatus, and plural gateway stations that are time-synchronized with each other and transmit and receive relay signals different from each other at a same frequency. The interference suppression method includes: calculating and storing a weight for suppressing an interference between feeder links with respect to each of plural combination patterns of the plural antennas for feeder link of the aerial-staying type communication relay apparatus and the plural gateway stations; selecting a calculation result of the weight of the combination pattern, which corresponds to the combination after changing, from the calculation results of the weights of the plural combination patterns, when the combination of the plural antennas for feeder link and the plural gateway stations changes due to at least one of the rotation and movement of the aerial-staying type communication relay apparatus; and suppressing an interference between feeder links when transmitting and receiving relay signals between the relay communication station and the plural gateway stations based on the selected calculation result of the weight of the combination pattern.

A program according to yet another aspect of the present invention is a program executed by a computer or processor that is incorporated in a relay communication station incorporated in an aerial-staying type communication relay apparatus and relays a radio communication of a terminal apparatus. The program includes: a program code for calculating and storing a weight for suppressing an interference between feeder links with respect to each of plural combination patterns of the plural antennas for feeder link of the aerial-staying type communication relay apparatus and the plural gateway stations; a program code for selecting a calculation result of the weight of the combination pattern, which corresponds to the combination after changing, from the calculation results of the weights of the plural combination patterns, when the combination of the plural antennas for feeder link and the plural gateway stations changes due to at least one of the rotation and movement of the aerial-staying type communication relay apparatus; and a program code for suppressing an interference between feeder links when transmitting and receiving relay signals between the relay communication station and the plural gateway stations based on the selected calculation result of the weight of the combination pattern.

Advantageous Effects of Invention

According to the present invention, when a combination of plural antennas for feeder link mounted on an aerial-floating type communication relay apparatus and plural gateway stations changes, since it is not necessary to calculate a weight corresponding to the changed combination pattern, it is possible to mitigate a deterioration of interference reduction performance between multi-feeder links due to a weight processing delay.

DESCRIPTION OF EMBODIMENTS

Hereinafter, embodiments of the present invention are described with reference to the drawings.

Figure 1:
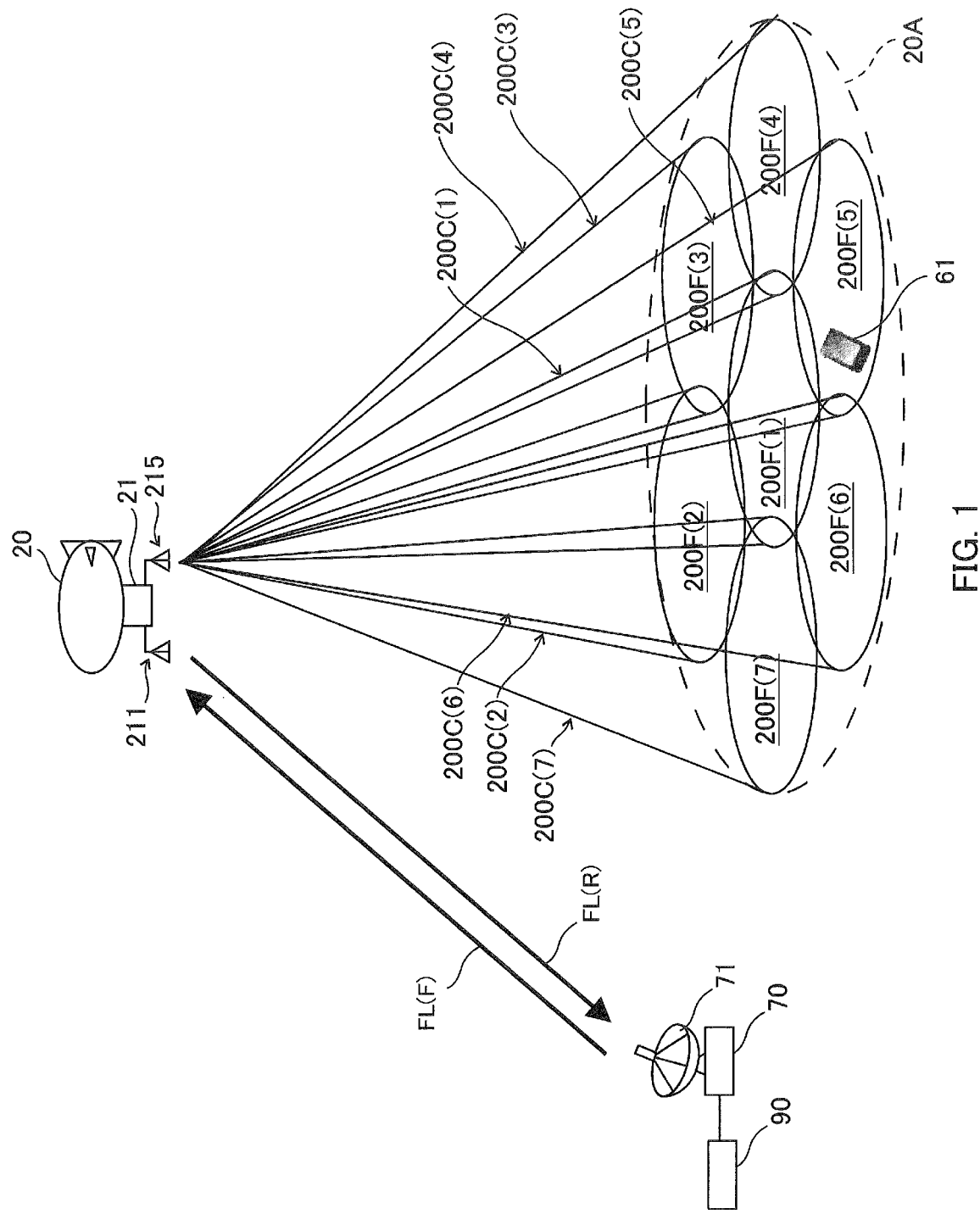
FIG. 1 is an illustration showing an example of a cell configuration of HAPS in a communication system according to an embodiment of the present invention.

FIG. 1 is an illustration showing an example of a cell configuration of HAPS 20 in a communication system according to an embodiment of the present invention. The communication system according to the present embodiment is suitable for realizing a three-dimensional network of the fifth-generation or the later generation mobile communication that supports simultaneous connection to a large number of terminal apparatuses, and low delay, etc. The mobile communication standards applicable to communication systems, radio relay stations, base stations, repeaters and terminal apparatuses disclosed in the present specification include the fifth-generation mobile communication standard and the fifth-generation and subsequent generation mobile communication standards.

As shown in FIG. 1, the communication system is provided with High-Altitude Platform Stations (HAPS) (also called "high altitude pseudo satellite" or "stratified platform") 20 as plural aerial-floating type communication relay apparatuses (radio relay apparatuses). The HAPS 20 is located in an airspace at a predetermined altitude, and forms a three-dimensional cell (three-dimensional area) in a cell-formation target airspace at a predetermined altitude. The HAPS 20 is an airship as a floating object that is controlled by autonomous control or external control so as to float or fly and be located in an airspace (floating airspace) with high altitude of 100 [km] or less from the ground level or the sea level, and a relay communication station 21 is mounted on the airship.

The airspace in which the HAPS 20 is located is, for example, a stratospheric airspace with altitude of 11 [km] or more and 50 [km] or less on the ground (or on the water such as the sea or lake). The airspace may be an airspace with altitude of 15 [km] or more and 25 [km] or less where weather conditions are relatively stable, and may be an airspace with altitude of about 20 [km] in particular.

The cell-formation target airspace, where is a target airspace for forming a three-dimensional cell with one or two or more HAPSs in the communication system of the present embodiment, is an airspace within a predetermined altitude range (for example, altitude range of 50 [m] or more and 1000 [m] or less) located between the airspace where the HAPS 20 is located and a cell-formation spatial area near the ground level covered by a base station (for example, LTE eNodeB) such as a conventional macro-cell base station.

It is noted that, the cell-formation target airspace, where the three-dimensional cell is formed in the present embodiment, may be an airspace over the sea, a river or a lake. Further, the three-dimensional cell formed by the HAPS 20 may be formed so as to reach the ground level or the sea level so that it can communicate with a terminal apparatus 61 located on the ground or on the sea.

Each of the relay communication stations of the HAPSs 20 forms plural beams for wirelessly communicating with the terminal apparatus 61 that is a mobile station, toward the ground by an antenna for service link (hereinafter referred to as "SL antenna") 215. The terminal apparatus 61 may be a communication terminal module incorporated in a drone that is an aircraft such as a small helicopter capable of remotely steering, or may be a user apparatus used by a user in an airplane. In the cell-formation target airspace, an area through which the beam passes is a three-dimensional cell. In the cell-formation target airspace, the plural beams adjacent to each other may be partially overlapped.

Each of the relay communication stations of the HAPSs 20 is, for example, a base station that wirelessly communicates with a gateway station (also referred to as a "feeder station") 70 as a relay station connected to a core network on the ground (or on the sea) side, or a slave repeater that wirelessly communicates with the feeder station (master repeater) 70 as a relay station connected to a base station on the ground (or on the sea) side.

The relay communication station 21 of the HAPS 20 is connected to a core network of a mobile communication network 80 via the feeder station 70, which is installed on the ground or on the sea, capable of radio communication by an antenna for feeder link (hereinafter referred to as "FL antenna") 211. A communication of feeder link between the HAPS 20 and the feeder station 70 may be performed by a radio communication using a radio wave such as a microwave or a millimeter wave, or may be performed by an optical communication using a laser light or the like.

Each of the HAPSs 20 may autonomously control its own floating movement (flight) and a process in the relay communication station 21 by executing a control program by a control section configured with a computer, etc. built in the inside. For example, each of the HAPSs 20 may acquire its own current position information (for example, GPS position information), position control information (for example, flight schedule information) stored in advance, position information on another HAPS located in a peripheral space, or the like, and may autonomously control the floating movement (flight) and the process in the relay communication station 21 based on these pieces of information.

The floating movement (flight) of each of the HAPSs 20 and the process in the relay communication station 21 may be controlled by a management apparatus (also referred to as a "remote control apparatus") as a management apparatus provided in a communication center or the like of the mobile communication network. The management apparatus can be configured with, for example, a computer apparatus such as a PC, a server, or the like. In this case, the HAPS 20 may incorporate a communication terminal apparatus for control (for example, mobile communication module) so that it can receive control information from the management apparatus and transmit various pieces of information such as monitoring information to the management apparatus, and may be assigned terminal identification information (for example, IP address, phone number, etc.) so that it can be identified from the management apparatus 8. The MAC address of the communication interface may be used to identify the communication terminal apparatus for control.

Further, each of the HAPSs 20 may transmit information on the floating movement (flight) of HAPS itself or its surroundings and the process at the relay communication station 21, and monitoring information such as information on the status of HAPS 20 and observation data acquired by various kinds of sensors, to a predetermined destination such as the management apparatus. The control information may include information on the target flight route of HAPS. The monitoring information may include at least one of information on current position, flight-route history information, velocity relative to the air, velocity relative to the ground and propulsion direction of the HAPS 20, wind velocity and wind direction around the HAPS 20, and atmospheric pressure and temperature around the HAPS 20.

Duplex methods of uplink and downlink for radio communication with the relay communication station 21 and the terminal apparatus 61 are not limited to specific methods, and may be, for example, a time division duplex method (Time Division Duplex: TDD) or a frequency division duplex method (Frequency Division Duplex: FDD). An access method for radio communication with the relay communication station 21 and the terminal apparatus 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time/same frequency, and may be an MU-MIMO (Multi-User MIMO) technology in which one base station transmits signals to plural communication terminal apparatuses different from each other on the same time/same frequency or plural different base stations transmit signals to one terminal apparatus on the same time/same frequency.

In the following embodiments, although the case where the communication relay apparatus having the relay communication station 21 that wirelessly communicates with the terminal apparatus 61 is an unmanned-airship type HAPS 20 will be illustrated and described, the communication relay apparatus may be a solar-plane type HAPS. Further, the following embodiments can be similarly applied to other aerial-floating type communication relay apparatuses other than HAPS.

A link between the HAPS 20 and a base station 90 via a gateway station (hereinafter abbreviated as "GW station") 70 as a feeder station is referred to as a "feeder link", and a link between the HAPS 10 and the terminal apparatus 61 is referred to as a "service link". In particular, a spatial section between the HAPS 20 and the GW station 70 is referred to as a "radio section of feeder link". Further, a downlink of a communication from the GW station 70 to the terminal apparatus 61 via the HAPS 20 is referred to as a "forward link", and an uplink of a communication from the terminal apparatus 61 to the GW station 70 via the HAPS 20 is also referred to as a "reverse link".

In FIG. 1, although the communication relay apparatus is the unmanned-airship type HAPS 20, it may be a solar-plane type HAPS. Further, in the illustrated example, although the HAPS 20 is located in the stratosphere with an altitude of about 20 km, the HAPS 20 forms plural cells 200C(1) to 200C(7), and a diameter of a service area 20A consisting of footprints 200F(1) to 200F(7) of the cells 200C(1) to 200C(7) of the plural cells (7 cells) configuration is 100 to 200 km, it is not limited to these examples.

In FIG. 1, a communication service that directly communicates with the terminal apparatus 61 on the ground (or on the water) using the HAPS 20 located in the stratosphere is very attractive as an expansion of service area and a communication means in the event of a disaster. The communication line of the HAPS 20 comprises a feeder link FL connecting the GW station 70 and the HAPS 20, and a service link SL connecting the HAPS 20 and the terminal apparatus 61. Since the communication capacity of the service link depends on the communication capacity of the feeder link which is the relay frequency, it is necessary to improve the frequency utilization efficiency of the feeder link. In particular, in case that the service link has a multi-cell configuration as shown in FIG. 1, the communication capacity of the feeder link tends to be insufficient, so that a frequency effective utilization technology for the feeder link is indispensable. However, in case that the HAPS 20 and the GW station 70 are configured one-to-one, it is difficult to improve the frequency utilization efficiency of the feeder link.

Therefore, in the present embodiment, a multiple-gateway system (hereinafter also referred to as a "multiple-GW system") is constructed, which is configured with plural GW stations that transmit and receive relay signals different from each other on a same frequency to and from the HAPS 20 in the feeder links of Frequency Division Duplex (FDD) method, and performs a spatial-division multiplex communication in a multi feeder link formed between one HAPS 20 and plural GW stations. In the multiple-GW system, by eliminating interference between the plural feeder links, the frequency utilization efficiency can be improved depending on the number of GW stations to be installed.

It is noted that, in the following embodiments, although it is described regarding some cases in which the spatial-division multiplex communication between the HAPS 20 and the plural GW stations is performed only by a forward link of the feeder link, the spatial-division multiplex communication may be performed only by a reverse link of the feeder link, or may be performed by both of the forward link and the reverse link.

Figure 2B:
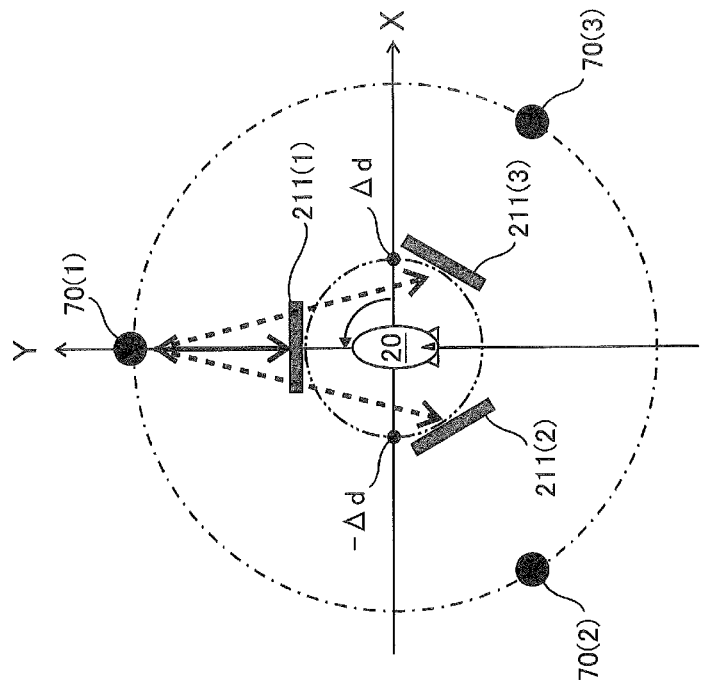
FIG. 2B is a top view illustration of a relationship between plural antennas for feeder link of HAPS and plural GW stations.
Figure 2A:
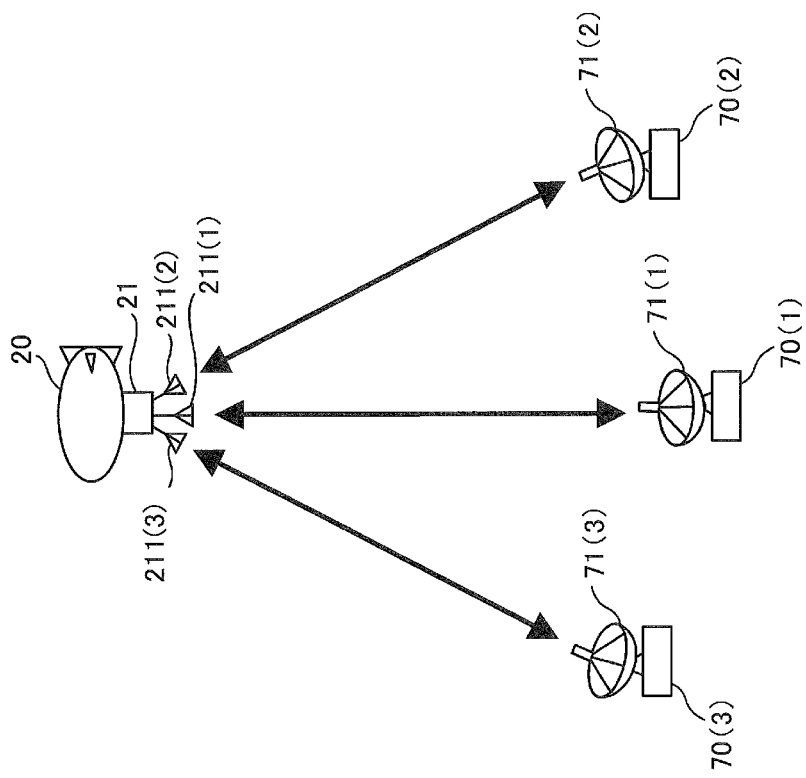
FIG. 2A is a side view showing an example of a schematic configuration of a multiple-GW system according to an embodiment.

FIG. 2A is a side view showing an example of a schematic configuration of a multiple-GW system according to the embodiment, and FIG. 2B is a top view illustration of a relationship between plural FL antennas 211(1) to 211(3) of the HAPS 20 and plural GW stations 70(1) to 70(3). In the illustrated example, each of the number of FL antennas (N) and the number of GW stations (N) is the same number (3 in the illustrated example), and the same number of FL antennas 211(1) to 211(3) and GW stations 70(1) to 70(3) are provided in a one-to-one correspondence with each other. The number of sets of the FL antenna 211 and the GW station 70 may be two sets, or may be four or more sets. Further, in the illustrated example, although the plural GW stations 70 are disposed so that distances from the HAPS 20 and intervals between the GW stations are equal to each other, at least one of the distances and the intervals may be different from each other. Each GW station 70 is disposed so that complex amplitudes received by each FL antenna 211 (also referred to as "HAPS station antenna") of the HAPS 20 are uncorrelated. Further, the antennas for feeder link (hereinafter referred to as "GW antennas") 71(1) to 71(3) of the GW stations 70(1) to 70(3) can transmit and receive radio signals with two kinds of polarized waves of vertically polarized waves (V) and horizontally polarized waves (H) which are orthogonal to each other. In the illustrated example, although the plural FL antennas 211(1) to 211(3) of the HAPS 20 are disposed so that distances from the center of the HAPS 20 and intervals between the FL antennas are equal to each other, at least one of the distances and the intervals may be different from each other between the FL antennas. For example, the distances and the intervals may be different from each other between the FL antennas.

Figure 3:
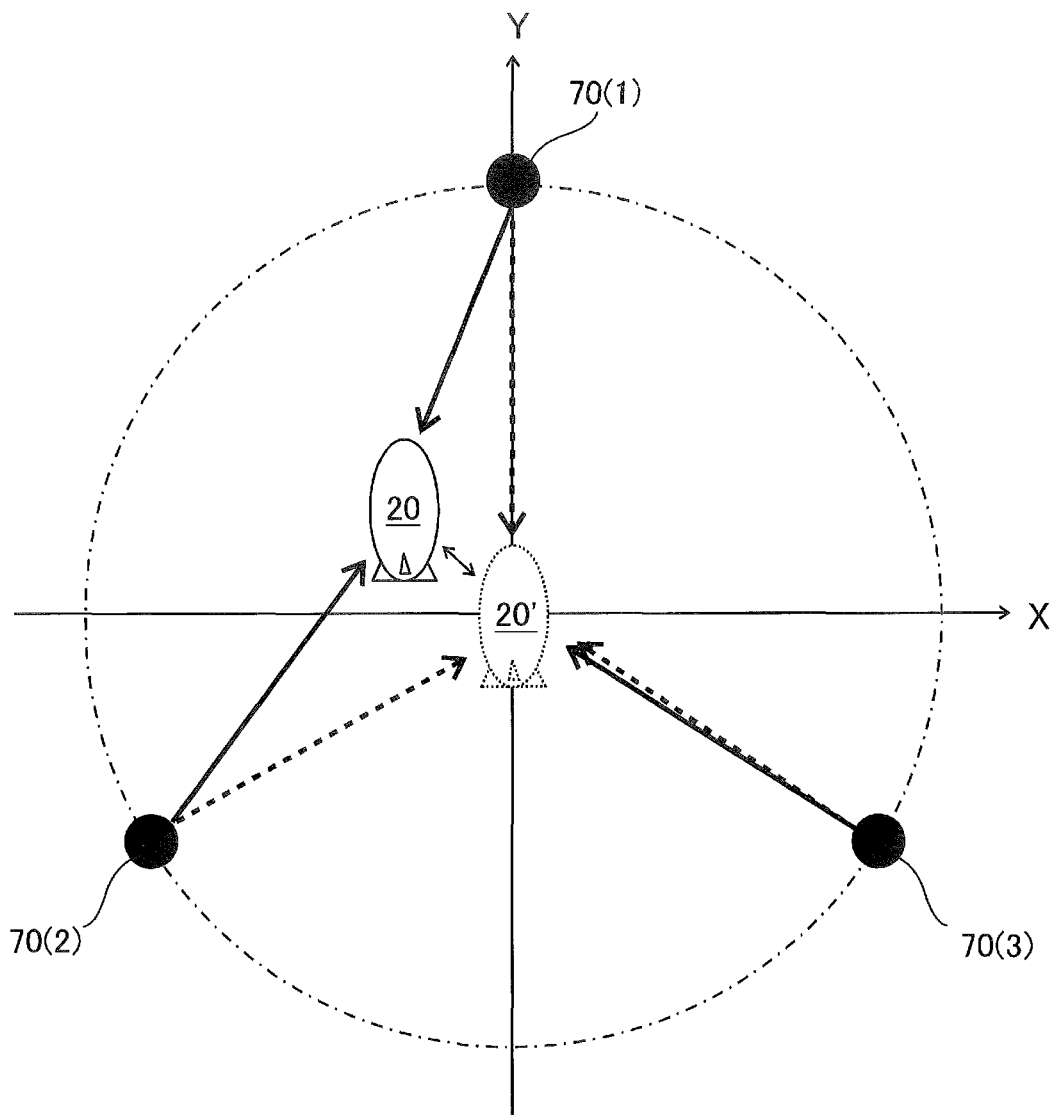
FIG. 3 is an illustration showing an example of a state that GW antennas of plural GW stations track HAPS according to an embodiment.

As shown in FIG. 3, each of the plural GW stations 70(1) to 70(3) may be provided with an antenna control section that controls the GW antennas 71(1) to 71(3) so as to track the HAPS 20 moving in an airspace. A HAPS 20' with dashed line in the figure indicates a position before the movement, and a solid line HAPS 20 in the figure indicates a position after the movement. By tracking the HAPS 20 by each of the GW antennas 71(1) to 71(3), even when using the GW antennas 71(1) to 71(3) with high directivity such as a parabolic antenna, it is possible to suppress the deterioration of the communication quality of the feeder link due to the movement of the HAPS 20.

Figure 4:
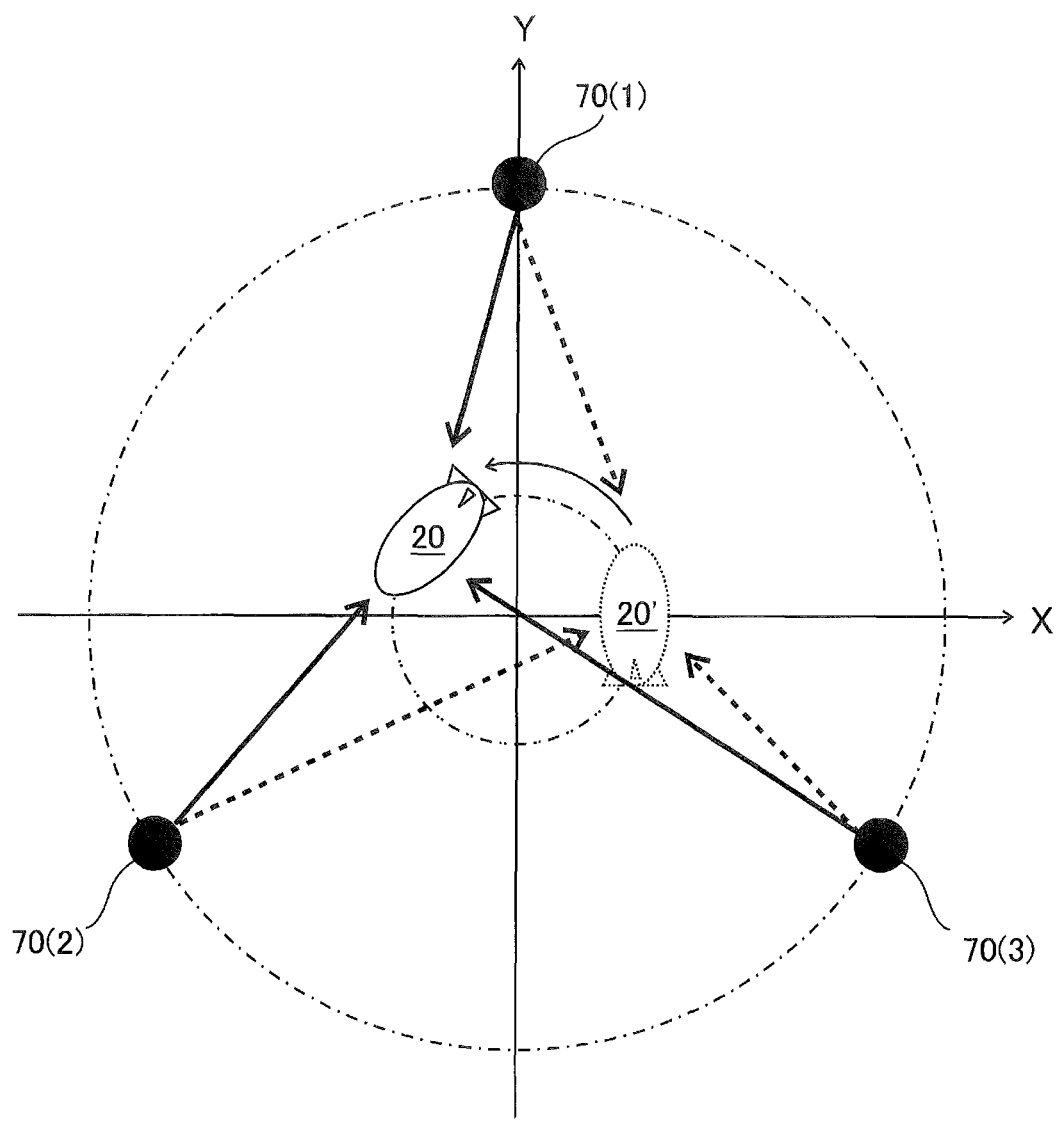
FIG. 4 is an illustration showing another example of a state that GW antennas of plural GW stations track HAPS according to an embodiment.

As shown in FIG. 4, each of the plural GW stations 70(1) to 70(3) may be provided with an antenna control section that controls the GW antennas 71(1) to 71(3) so as to track the HAPS 20 that swivels and moves (swirl flight) in upper airspace. The broken line HAPS 20' in the figure indicates the position before the turning movement, and solid line HAPS 20 in the figure indicates the position after the turning movement. By tracking the HAPS 20 by each of the GW antennas 71(1) to 71(3), even when the GW antennas 71(1) to 71(3) having high directivity such as a parabolic antenna are used, it is possible to suppress the deterioration of the communication quality of the feeder link due to the turning movement of the HAPS 20.

Figure 5:
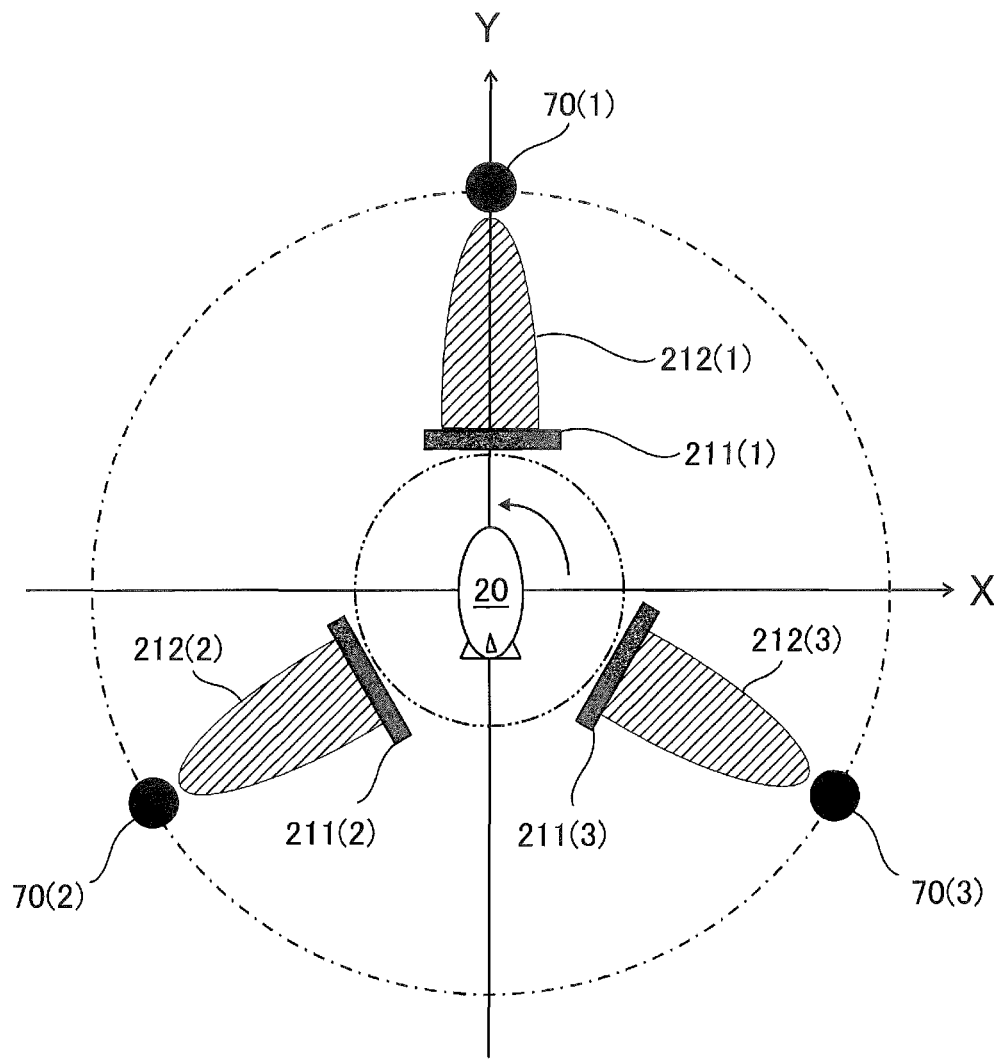
FIG. 5 is an illustration showing an example of directional beams of plural FL antennas of HAPS according to an embodiment.

As shown in FIG. 5, the plural FL antennas 211(1) to 211(3) of the HAPS 20 may include antenna directional beams (hereinafter referred to as "directional beams" or "beams") 212(1) to 212(3) respectively corresponding to the GW stations 70(1) to 70(3), and the HAPS 20 may be provided with an antenna control section that controls the FL antennas 211(1) to 211(3) so that the directional beams 212(1) to 212(3) of the plural FL antennas 211(1) to 211(3) is respectively directed in the direction of the corresponding GW stations 70(1) to 70(3). Each of the directional beams 212(1) to 212(3) of the FL antennas 211(1) to 211(3) is formed, for example, so as to face the GW station 70 closest to itself and not to provide an interference to other GW stations, that is, so that a ratio (F/B) of a gain of the main beam and a gain in the opposite direction becomes sufficiently large. As a result, even when the HAPS 20 moves or rotates, it is possible to suppress the deterioration of the communication quality of the feeder link due to the movement and rotation of the HAPS 20.

As a control system of the directional beams 212(1) to 212(3) of the plural FL antennas 211(1) to 211(3) by the antenna control section of the HAPS 20, it is capable of using various systems such as a gimbal system, an electric system (beamforming control system of 360 degrees), and an electric system (angle-limited beamforming control system+antenna switching).

Figure 6:
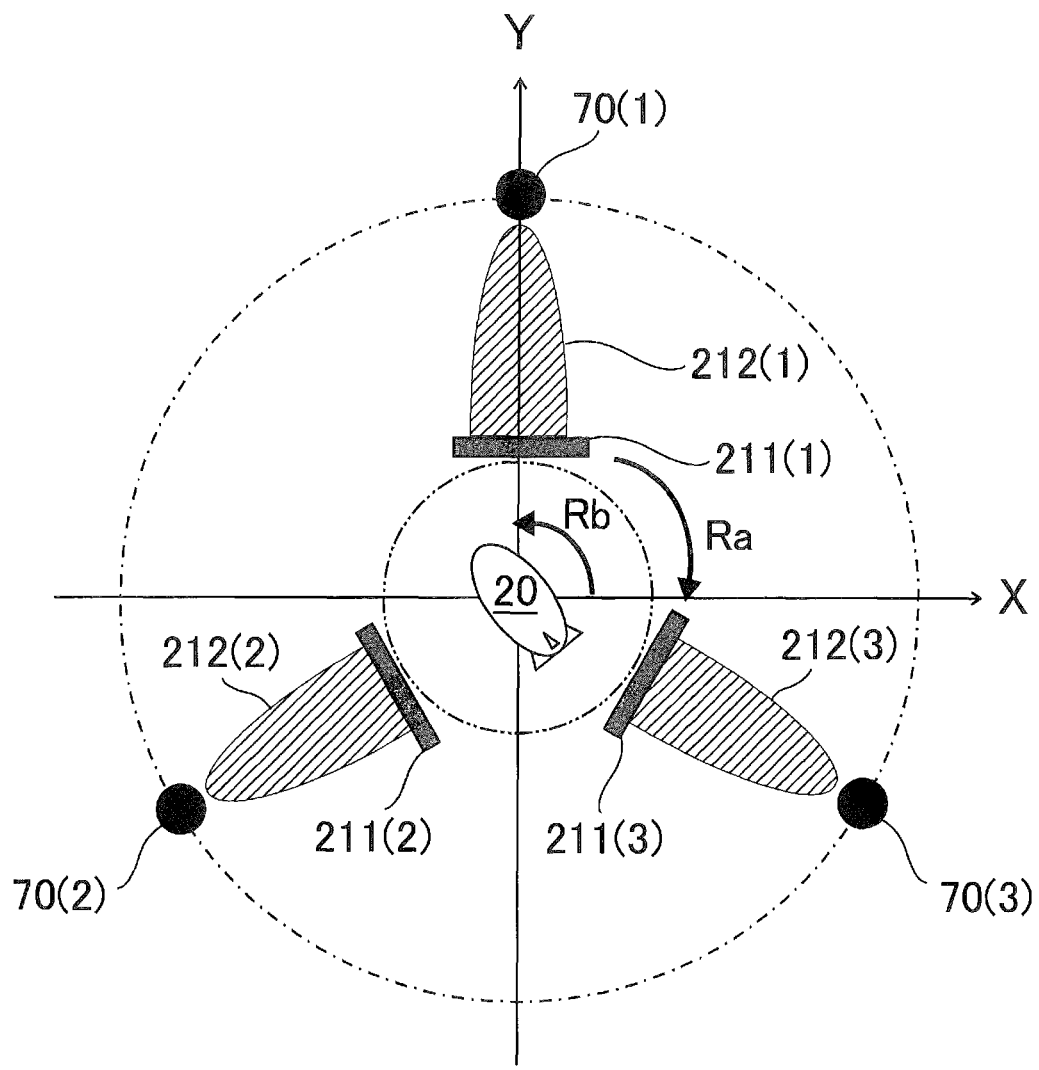
FIG. 6 is an illustration showing an example of directional beam control of FL antenna in HAPS according to an embodiment.

For example, in the gimbal system in FIG. 6, in accordance with the rotation (turning) around the vertical axis (yawing axis, Z axis) of the HAPS 20, the rotation drive of the whole of plural FL antennas 211(1) to 211(3) can be mechanically controlled around the foregoing axis. For example, in FIG. 6, when the HAPS 20 rotates about 45 degrees in the left direction of rotation (counterclockwise direction) Rb, the rotation of the whole of plural FL antennas 211(1) to 211(3) are mechanically driven in the right direction of rotation (clockwise direction) Ra opposite to the foregoing direction of rotation of the HAPS 20.

Although the rotational drive control for angle adjustment of each of the FL antennas 211(1) to 211(3) may be performed with reference to information on a position and an orientation of the HAPS, the rotational drive control of respective FL antenna 211(1) to 211(3) may be performed with reference to reception level values of the FL antennas 211(1) to 211(3). For example, each of the FL antennas 211(1) to 211(3) is rotated in small steps, an angle for maximizing the reception level of each of the FL antennas 211(1) to 211(3) is found, and the rotational drive control of each of the FL antennas 211(1) to 211(3) is performed so as to face the angle. Herein, a threshold value may be set for each of the reception levels of each of the FL antennas 211(1) to 211(3), each of the FL antennas 211(1) to 211(3) may be rotated by a predetermined angle when the reception level falls below the foregoing threshold, and the rotational drive control of the FL antennas 211(1) to 211(3) may be performed to the directional angle at which the reception level is maximized. The threshold value of the reception level may be obtained, for example, by an experiment in advance, and the predetermined angle may be, for example, 360 degrees/number of FL antennas (120 degrees in the illustrated example). Further, a monitoring beam for comparing the reception level from the GW stations other than the corresponding GW station may be generated from the FL antenna 211(1) to 211(3), a GW station having the maximum level may be selected, and the rotational drive of each of the FL antennas 211(1) to 211(3) may be controlled so that the directional beam is directed in the direction to the selected GW station.

It is noted that, although the angle adjustment in the horizontal direction of each of the FL antennas 211(1) to 211(3) is shown in FIG. 6, the angle adjustment in the vertical direction may be also performed in the same manner.

By the rotational drive control of the FL antennas 211(1) to 211(3), even if the HAPS 20 rotates, since the directional beams 212(1) to 212(3) of the FL antennas 211(1) to 211(3) are directed in the corresponding directions of the GW stations 70(1) to 70(3) respectively, the deterioration of the communication quality of the feeder link can be prevented.

Figure 7:
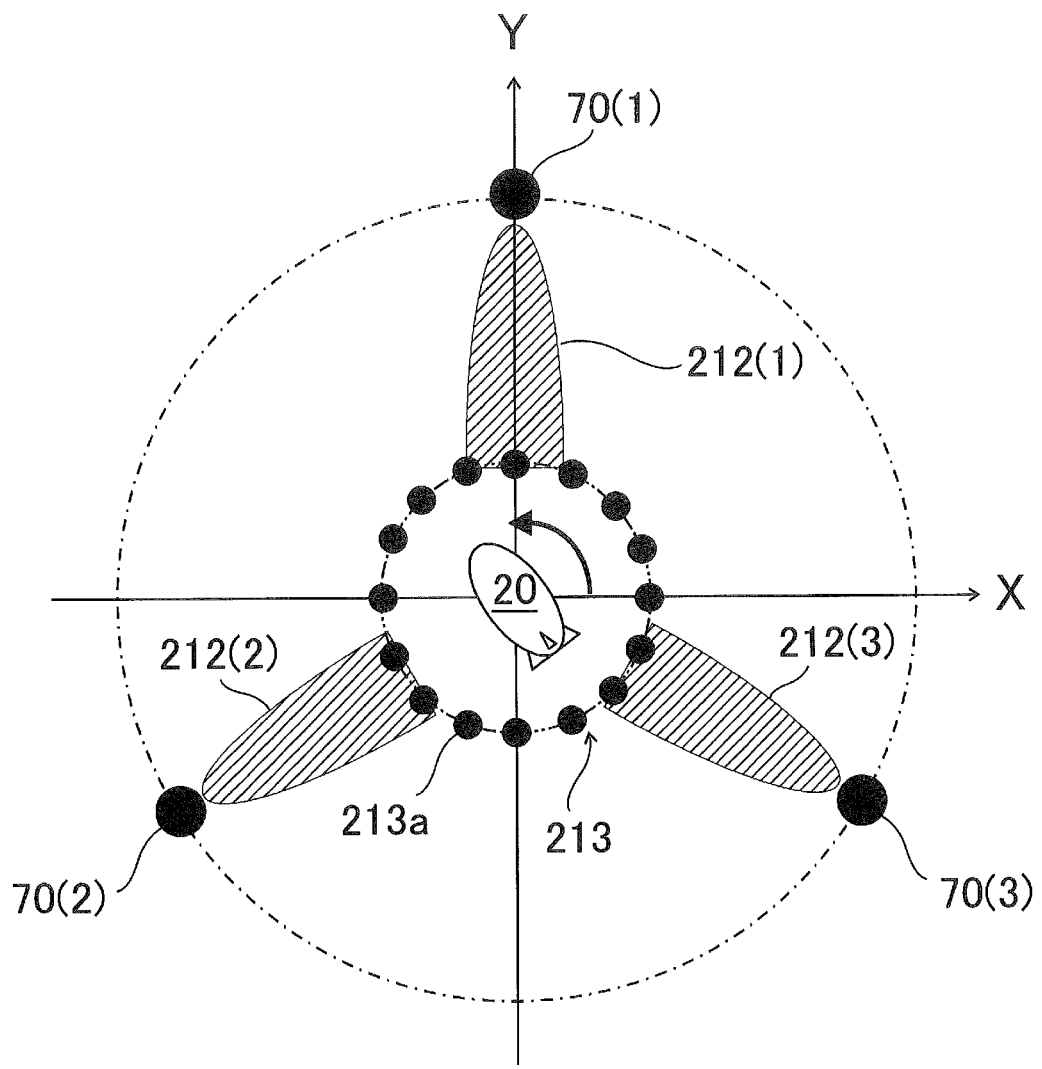
FIG. 7 is an illustration showing another example of directional beam control of FL antenna in HAPS according to an embodiment.

In the electric system (360-degrees beamforming control system) in FIG. 7, a circular array antenna 213 in which plural antenna elements 213a are disposed along the circumferential shape is provided as a FL antenna. Based on information on a position and an attitude of the HAPS 20, a weight applied to signals (amplitude, phase) transmitted and received via each of the plural antenna elements 213a is controlled. For example, the information on the position and attitude of HAPS 20 may be acquired based on an output of a GNSS inertial navigation system (GNSS/INS) that combines a GNSS (Global Navigation Satellite System) system and an inertial measurement unit (IMU: Inertial Measurement Unit) incorporated in the HAPS 20.

Although the weight control of each antenna element 213a of the circular array antenna 213 may be performed with reference to the information on the position and the attitude of the HAPS, the weight control of each antenna element 213a may be performed so as to form a directional beam having the maximum reception level at a directional position corresponding to each GW station with reference to the reception level value of each antenna element 213a of the circular array antenna 213. For example, a phase of each antenna element 213a of the circular array antenna 213 is changed in small steps, an angle for maximizing the reception level is found, and the weight control of each antenna element 213a is performed so that a beam is formed in the direction of the found angle. Further, a monitoring beam for comparing the reception level from the GW stations other than the corresponding GW station may be generated from the circular array antenna 213, a GW station having the maximum level may be selected, and a beam may be formed in the direction to the selected GW station.

It is noted that, although the beam angle adjustment in the horizontal direction is shown in FIG. 7, the beam angle adjustment may be also performed in the same manner in the vertical direction.

By controlling the weight of each antenna element 213a of the circular array antenna 213, the directional beams 212(1) to 212(3) respectively directed in the directions to the plural GW stations 70(1) to 70(3) are formed. As a result, even if the HAPS 20 rotates, since the directional beams 212(1) to 212(3) of the FL antennas 211(1) to 211(3) are directed in the corresponding directions to the GW stations 70(1) to 70(3) respectively, the deterioration of the communication quality of the feeder link can be prevented.

Figure 8:
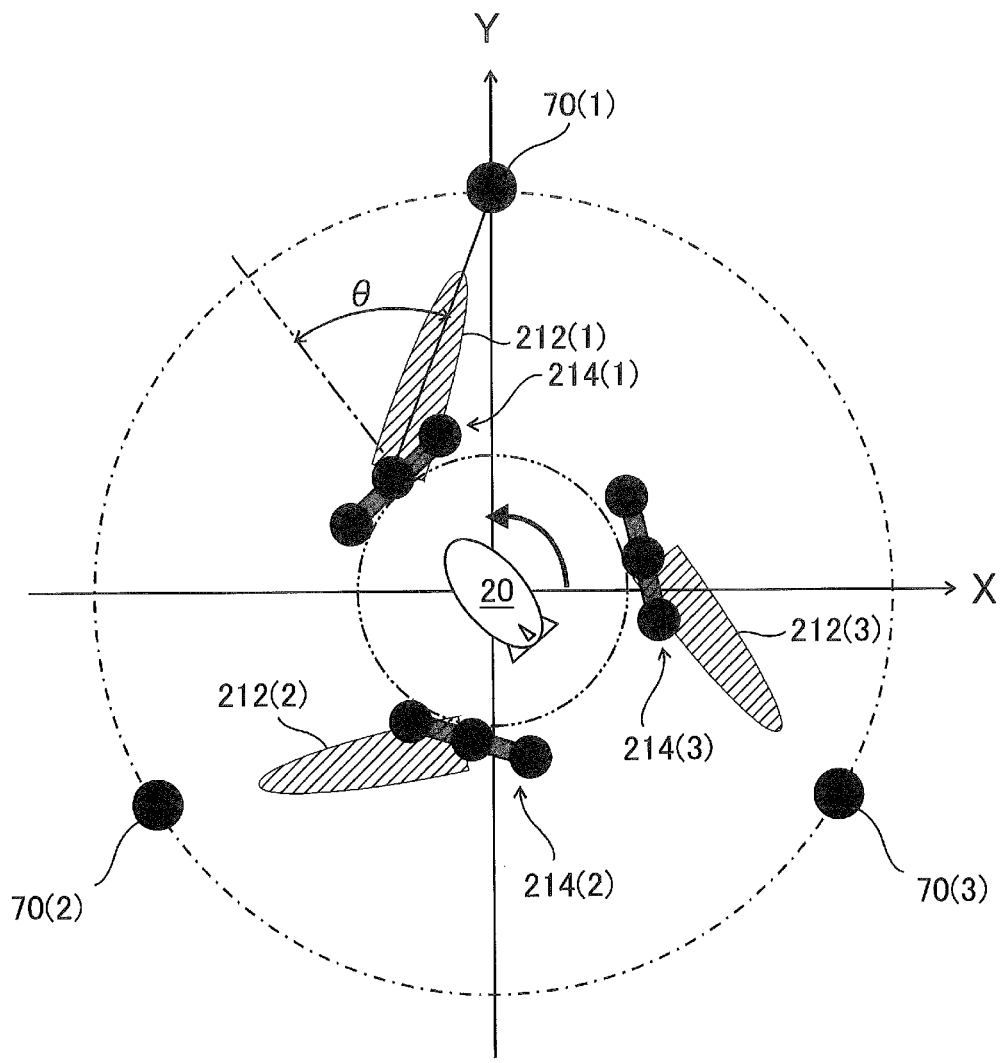
FIG. 8 is an illustration showing yet another example of directional beam control of FL antenna in HAPS according to an embodiment.

In the electric system (beamforming control system with limited angle+antenna switching) of FIG. 8, plural planar array antennas 214(1) to 214(3) in which plural antenna elements 214a of each array antenna are two-dimensionally disposed in a plane are provided as a FL antenna. Based on information on the position and the attitude of the HAPS 20 acquired by GNSS/INS etc., a beamforming control is performed to control a weight applied to a signal (amplitude, phase) transmitted and received via each of the plural antenna elements 214a of the plural planar array antennas 214(1) to 214(3).

Although the control of the switching and the beamforming of the planar array antennas 214(1) to 214(3) may be performed with reference to the information on the position and the attitude of the HAPS, the antenna switching and beamforming may be controlled so that each of the planar array antennas 214(1) to 214(3) has the maximum reception level with reference to the reception level value of each planar array antenna 214(1) to 214(3). For example, each of the planar array antenna 214(1) to 214(3) is rotated in small steps, an angle for maximizing the reception level of respective planar array antenna 214(1) to 214(3) is found, and the rotational drive control of each antenna is performed so as to be directed to the found angle. Herein, a threshold value may be set for each of the reception levels of each of the planar array antennas 214(1) to 214(3), when the reception level falls below the foregoing threshold value, the planar array antennas 214(1) to 214(3) may be switched and each of the planar array antennas 214(1) to 214(3) may be rotated by a predetermined angle, and a beamforming may be performed to form a beam to the directional angle at which the reception level is maximized. The threshold value of the reception level may be obtained, for example, by an experiment in advance, and the predetermined angle may be, for example, 360 degrees/number of FL antennas (120 degrees in the illustrated example). Further, a monitoring beam for comparing the reception level from the GW stations other than the corresponding GW station may be generated from the planar array antennas 214(1) to 214(3), a GW station, for which each of the planar array antennas 214(1) to 214(3) has the maximum level, may be selected, and an antenna switching and a beamforming may be performed so as to form a beam in the direction to the selected GW station.

It is noted that, although the beam angle adjustment in the horizontal direction is shown in FIG. 8, the beam angle adjustment may be also performed in the same manner in the vertical direction.

By controlling the switching and the beamforming of the planar array antennas 214(1) to 214(3), the directional beams 212(1) to 212(3) respectively directed in the directions to the plural GW stations 70(1) to 70(3) are formed. Herein, for example, when the angle (θ in the figure) at which the directional beam 212(1) is tilted with respect to the normal direction perpendicular to the plane of the planar array antenna 214(1) becomes larger than the preset predetermined angle θth degrees, the FL antenna corresponding to the GW station 70(1) is switched to the planar array antenna 214(2). As a result, even if the HAPS 20 rotates, each of the directional beams 212(1) to 212(3) of the FL antennas 211(1) to 211(3) are directed in the directions to the corresponding GW stations 70(1) to 70(3), so that the deterioration of the communication quality of the feeder link can be prevented.

Figure 9:
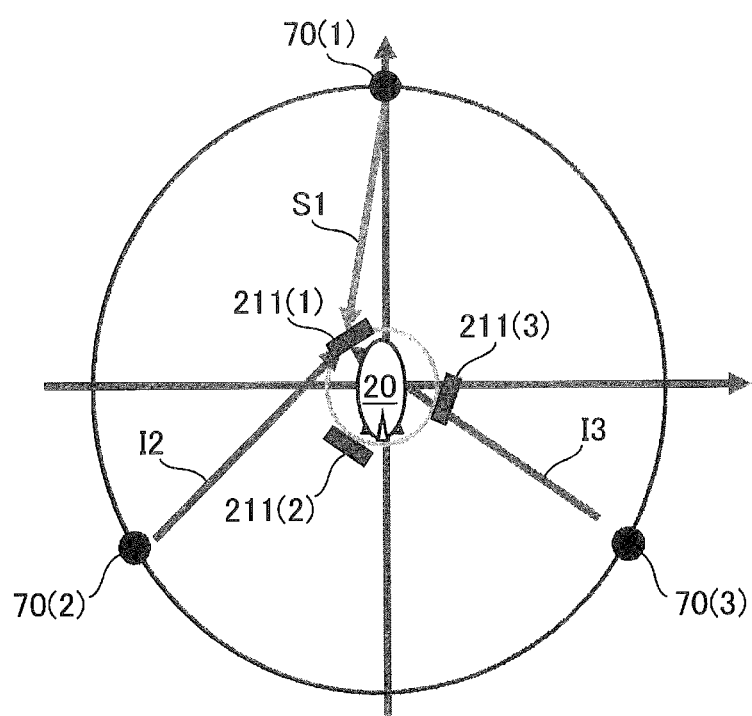
FIG. 9 is an illustration of an example of forward link interference between GW stations (between feeder links) in the multiple-GW system.
Figure 10:
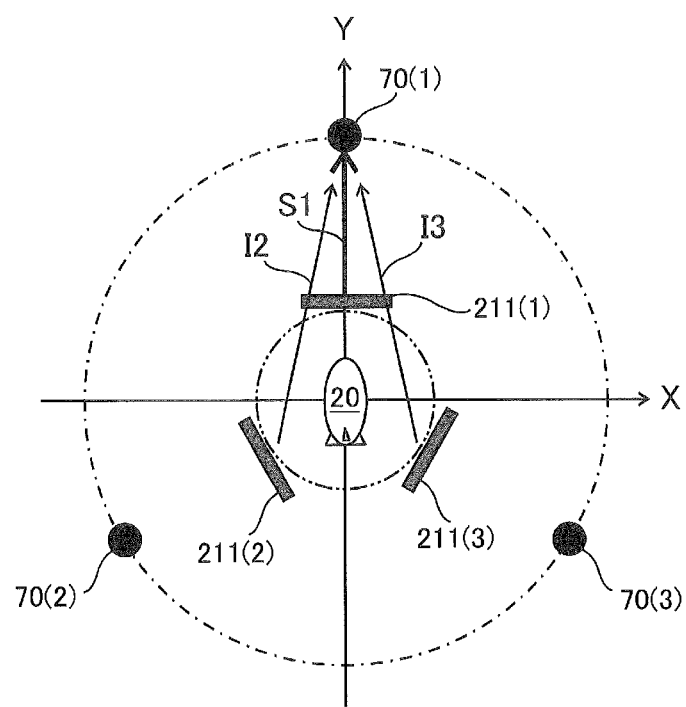
FIG. 10 is an illustration of an example of reverse link interference between GW stations (between feeder links) in the multiple-GW system.

In the multiple-GW system with the above-described configuration, an interference in at least one of the forward link and the reverse link between GW stations (between feeder links) may increase. For example, as shown in FIG. 9, while a desired signal (desired signal) S1 transmitted from the GW station 70(1) is received by the FL antenna 211(1) of the HAPS 20, signals transmitted from the other GW stations 70(2) and 70(3) are received by the FL antenna 211(1) as interference signals I2 and I3. Therefore, SINR characteristics of the feeder link may deteriorate. As shown in FIG. 10, when a desired signal (desired signal) S1 transmitted from the FL antenna 211(1) of the HAPS 20 is receiving by the GW station 70(1), signals transmitted from the other FL antennas 211(2) and 211(3) of the HAPS 20 are received by the GW station 70(1) as interference signals I2 and I3. Accordingly, the SINR characteristics of the feeder link (reverse link) may deteriorate.

Therefore, in the present embodiment, by applying a MIMO interference canceller supporting the line-of-sight environment (LOS: Line-Of-Sight) between the GW stations (between the feeder links) as shown below and by reducing an interference of forward link and reverse link between the GW stations (between the feeder links), the SINR characteristics of the feeder link (forward, reverse link) are improved.

First, a configuration and a method for reducing a forward link interference between the GW stations (between the feeder links) in the multiple-GW system of the present embodiment will be described.

[MIMO Interference Canceller (Reception Interference Canceller) of the forward link on the HASP side (transmission side)]

Figure 11:
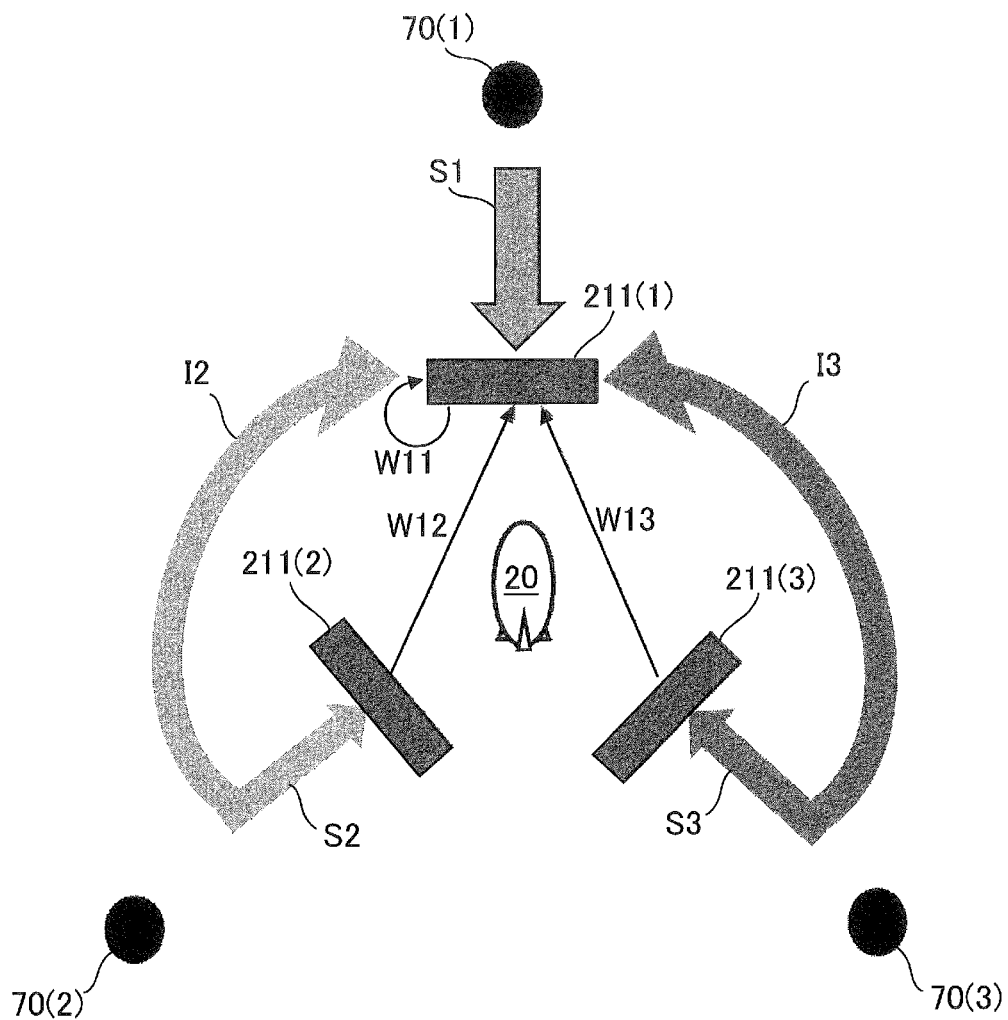
FIG. 11 is an illustration showing an example of a MIMO interference canceller to which a weight W is obtained by an approximate expression and applied.
Figure 12:
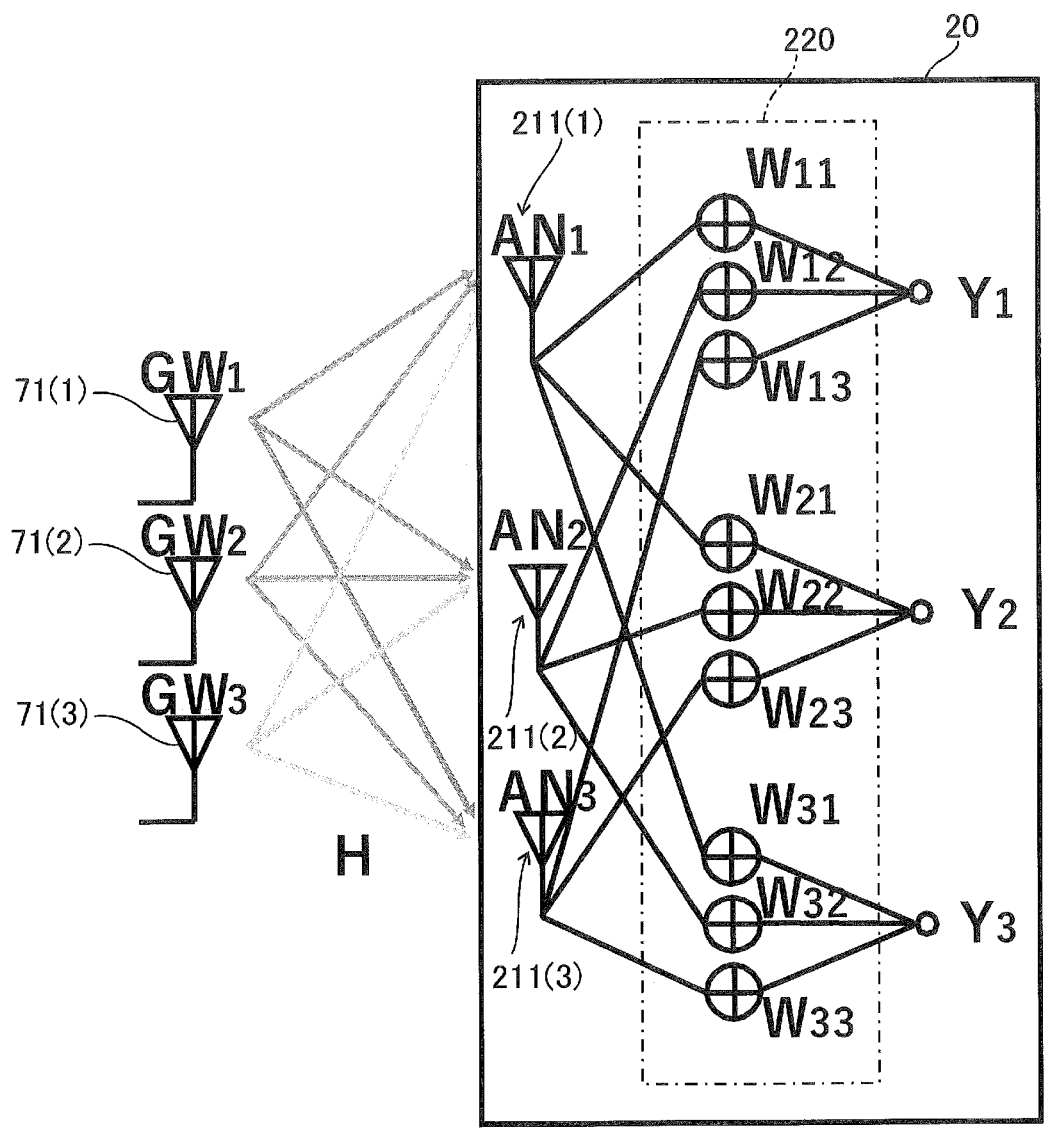
FIG. 12 is an illustration showing an example of a schematic configuration of an interference canceller section of a forward link provided on HAPS side (reception side) in a multi-feeder link of a multiple-GW system according to an embodiment.

FIG. 11 is an illustration showing an example of a MIMO interference canceller to which a weight W is obtained by an approximate expression and applied. FIG. 12 is an illustration showing an example of a schematic configuration of an interference canceller section 220 of a forward link provided on the HAPS side (transmission side) in the multi-feeder link of the multiple-GW system according to the embodiment. The FL antenna 211(1) of the HAPS 20 receives the desired signal S1(Y11) transmitted from the GW station 70(1), the interference signal I2(Y12) transmitted from the GW station 70(2), and the interference signal I3(Y13) transmitted from the GW station 70(3). The reception signal ANI is represented by the following equation (1).

$$AN1 = S1 + I2 + I3 \qquad (1)$$

In the interference canceller section 220 of the HAPS 20, as shown in the following equation (2), by subtracting the signals S2 and S3 received by the other FL antennas 211(2) and 211(3) that are multiplied by the weights W2 and W3 respectively corresponding to the signals S2 and S3, the desired signal S1(Y11) in which the interference signals I2 and I3 are canceled can be outputted. Similarly, the interference signals from other GW stations can be canceled for the desired signals S2(Y22) and S3(Y33) transmitted from the GW stations 70(2) and 70(3).

$$S1 = w11 \cdot AN1 + w12 \cdot AN2 + w13 \cdot AN3 \qquad (2)$$

Figure 13:
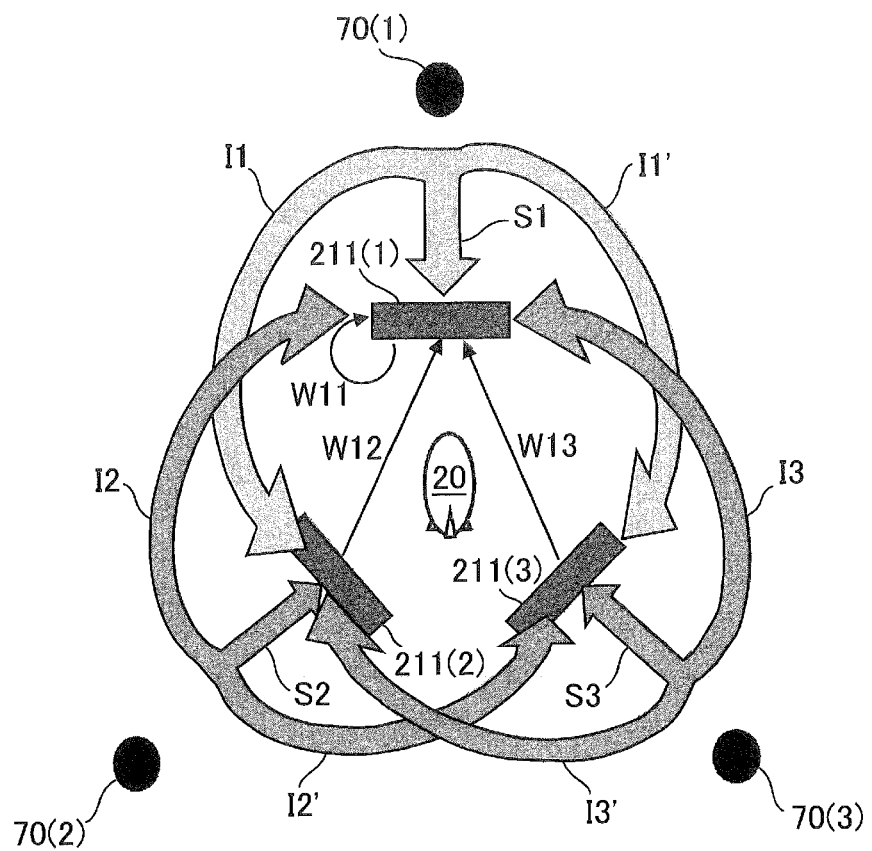
FIG. 13 is an illustration showing an example of a MIMO interference canceller to which a weight W is obtained by the ZF method and applied.

FIG. 13 is an illustration showing an example of a MIMO interference canceller to which a weight W is obtained by the ZF (Zero-Forcing) method and applied. For example, a signal transmitted from the GW station 70(1) is not only received by the FL antenna 211(1) of the HAPS 20 as the desired signal S1(Y11), but also received by the FL antennas 211(2) and 211(3) as interference signals I1(Y12) and I1' (Y13). A signal transmitted from the GW station 70(2) is not only received by the FL antenna 211(1) as the interference signal I2(Y21), but also received by the FL antenna 211(3) as an interference signal I2'(Y23). Further, a signal transmitted from the GW station 70(3) is not only received by the FL antenna 211(1) as the interference signal I3(Y31), but also received by the FL antenna 211(2) as an interference signal I3'(Y32). In the MIMO interference canceller of FIG. 13, these interference signals I1, I1', I2' and I3' are taken into consideration, for example, the desired signal S1(Y11) is outputted as shown in the following equation (3). As a result, the accuracy of interference suppression between GW stations (between feeder links) can be improved.

$$S1 = w11(Y11 + Y12 + Y13) + \\ w12(Y21 + Y22 + Y23) + w13(Y31 + Y32 + Y33) \qquad (3)$$

In order to calculate the weight W used for the MIMO interference canceller, it is necessary to grasp the propagation path response H (see FIG. 14) between the FL antennas 211(1) to 211(3) of the HAPS 20. In particular, in the multiple-GW system of the present embodiment, since the airframe of the HAPS 20 moves relative to the GW stations 70(1) to 70(3), the propagation path response H also changes according to the movement.

Figure 14:
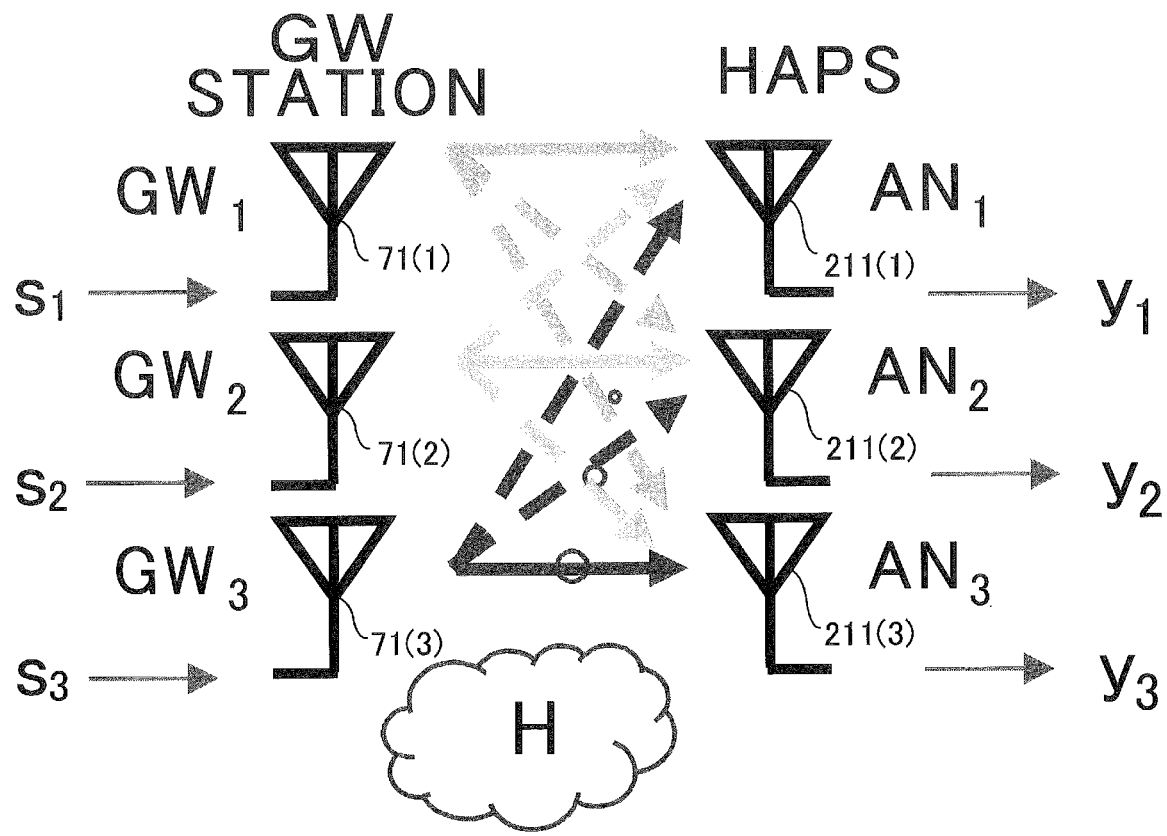
FIG. 14 is an illustration showing an example of a propagation path response H of feeder link in a multiple-GW system according to an embodiment.

The following equation (4) shows an example of the propagation path response H of the propagation paths between the antennas of the GW stations 70(1) to 70(3) and the FL antennas 211(1) to 211(3) of the HAPS 20 in the multiple-GW system shown in FIG. 14. Each of the antennas of the GW stations 70(1) to 70(3) transmits desired signals (desired signals) $s_1$, $s_2$, $s_3$, and the FL antennas 211(1) to 211(3) of the HAPS 20 receive radio waves from the GW stations 70(1) to 70(3) and output reception signals $y_1$, $y_2$, $y_3$.

$$H = \begin{bmatrix} h_{11} & h_{12} & h_{13} \\ h_{21} & h_{22} & h_{23} \\ h_{31} & h_{32} & h_{33} \end{bmatrix} \quad (4)$$

The following equation (5) shows matrix elements in the propagation path response H. The $|h_{ij}|$ in the equation (5) corresponds to a reception signal level of the signal that is transmitted from the antenna of the i-th GW station 70(i) and received by the j-th FL antenna 211(j) of the HAPS 20. The $d_{ij}$ in the equation (5) is the path length (see FIG. 9) between the antenna of the GW station 70(i) and the j-th FL antenna 211(j) of the HAPS 20. Each of the "f" and "c" in the equation (5) is the frequency and velocity (=velocity of light) of the signal transmitted and received.

$$h_{ij} = |h_{ij}|e^{j2\pi f d_{ij}/c} \quad (5)$$

As shown in the above equations (4) and (5), in order to estimate the propagation path response H, it is necessary to grasp the path length $d_{ij}$ between the GW station 70(i) and the FL antenna 211(j) of the HAPS 20. It is difficult to grasp each path length $d_{ij}$. Therefore, in the present embodiment, instead of grasping each path length $d_{ij}$, a path length between antennas for transmitting and receiving the desired signal is defined as a reference path length ds in the feeder link of the multiple-GW system, a path length between the other antennas is represented by the reference path length ds and a path difference Δd, and a relative propagation path response (hereinafter also referred to as "relative-propagation path response") consisting of a path difference component with respect to a propagation path response (hereinafter also referred to as "reference-propagation path response") consisting of a reference path component that serves as a reference is estimated by obtaining the path difference Δd.

Figure 15:
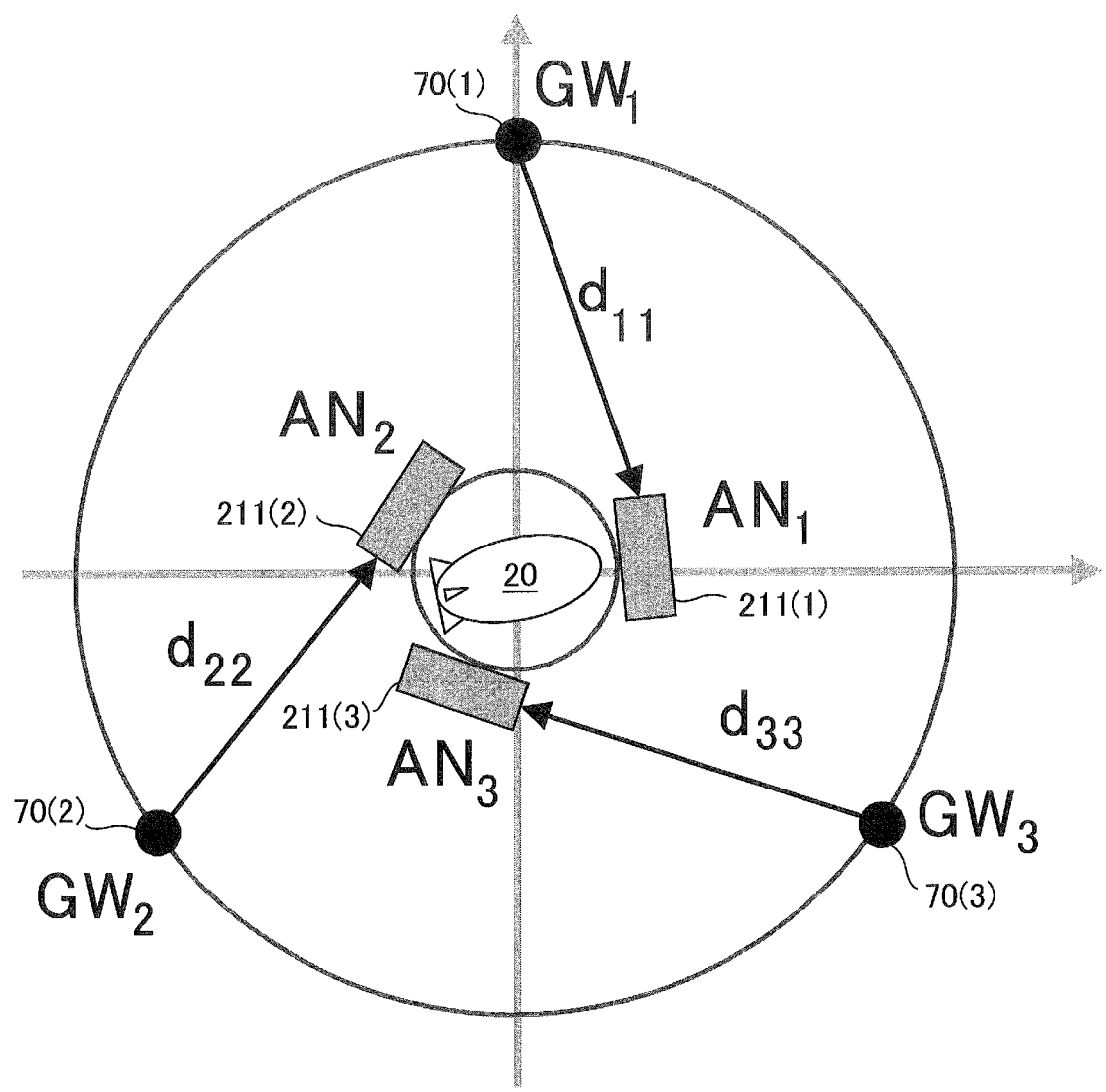
FIG. 15 is an illustration showing an example of a reference path length in a multiple-GW system according to an embodiment.

For example, in the feeder links of the multiple-GW system of FIG. 15, the GW station 70(1) transmits the desired signal to the FL antenna 211(1) of the HAPS 20, the GW station 70(2) transmits the desired signal to the FL antenna 211(2) of the HAPS 20, and the GW station 70(3) transmits the desired signal to the FL antenna 211(3) of the HAPS 20. Therefore, each of the three path lengths $d_{ii}$ (i=1, 2, 3) between the antenna of the GW stations 70(i) and the FL antennas 211(i) is the reference path length, and each of the path lengths $d_{ij}$ (i≠j) between the antenna of the other GW stations 70(i) and the FL antennas 211(j) can be represented by the sum of the reference path length $d_{ii}$ (i=1, 2, 3) and the path difference $\Delta d_{ij}$ (i≠j).

Figure 16:
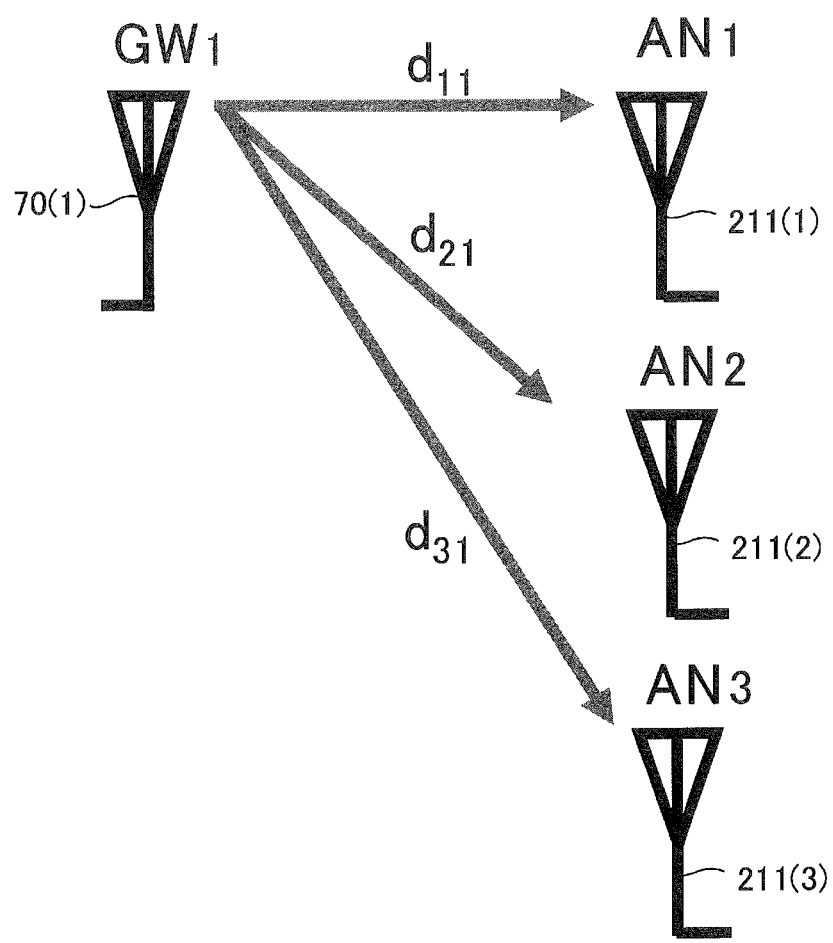
FIG. 16 is an illustration showing an example of a path length between the antenna of the GW station and the FL antenna of HAPS in FIG. 15.
Figure 17:
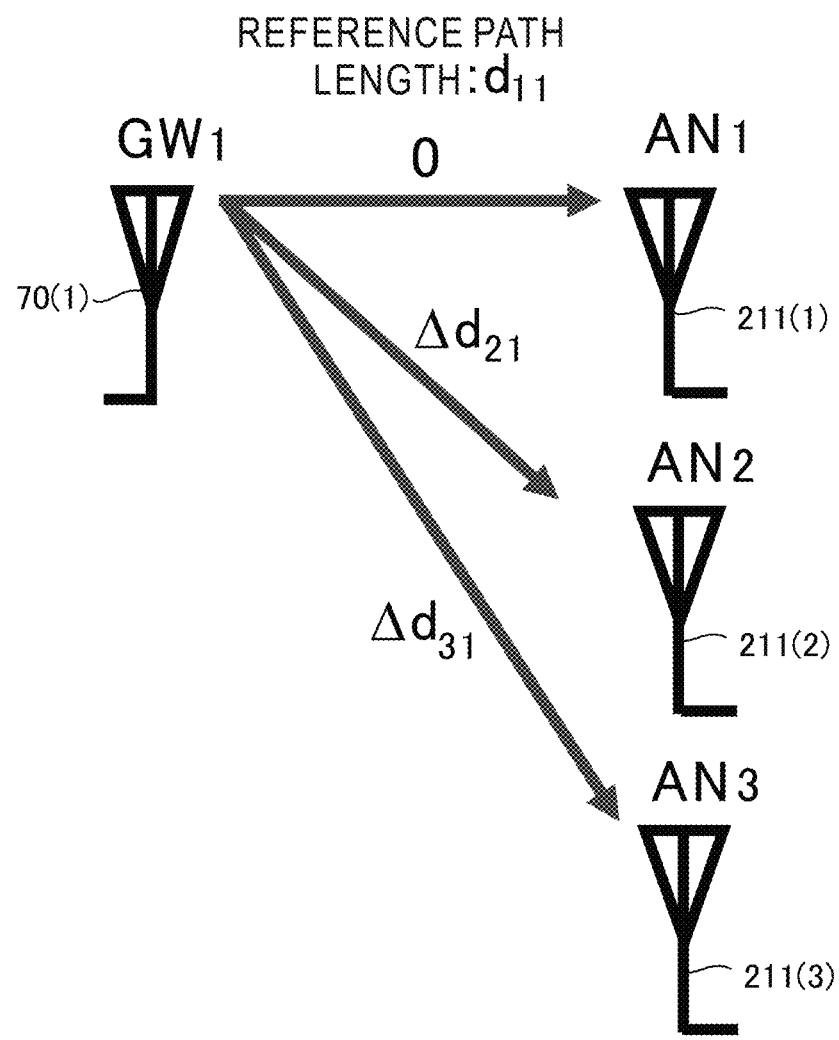
FIG. 17 is an illustration showing an example of a path difference based on the reference path length between the antenna of the GW station and the FL antenna of HAPS in FIG. 15.

For example, in case of the propagation path in which the signal transmitted from the first GW station 70(1) is received by each of FL antenna 211(1) to 211(3) of the HAPS 20, it is difficult to directly grasp the path lengths $d_{11}$, $d_{21}$, and $d_{31}$ (see FIG. 16) between the antenna of the GW station 70(1) and the respective FL antenna 211(1) to 211(3) of the HAPS 20. Assuming that the path length di between the antenna of the GW station 70(1) and the FL antenna 211(1) for transmitting and receiving the desired signal is the reference path length, the path lengths $d_{21}$ and $d_{31}$ of the other paths can be represented by the sum of the reference path length $d_{11}$ and the path differences $\Delta d_{21}$ and $\Delta d_{31}$ (see FIG. 17) as shown in the following equation (6).

$$\begin{aligned} d_{21} &= d_{11} + \Delta d_{21} \\ d_{31} &= d_{11} + \Delta d_{31} \end{aligned} \quad (6)$$

The path difference $\Delta d_{ij}$ (i≠j) can be grasped by a pilot signal as described below. As shown in the following equation (7), the propagation path response H can be represented by the relative-propagation path response consisting of the path difference component $\Delta h_{ij}$ (i≠j) and the reference-propagation path response consisting of the reference path component $h_{ii}$ (i=1, 2, 3). Further, the path difference component $\Delta h_{ij}$ in the equation (7) is represented by the following equation (8). By obtaining the path difference $\Delta d_{ij}$ in the equation (8), the relative-propagation path response (path difference component $\Delta h_{ij}$) with respect to the reference-propagation path response is estimated.

$$H = \begin{bmatrix} h_{11} & h_{12} & h_{13} \\ h_{21} & h_{22} & h_{23} \\ h_{31} & h_{32} & h_{33} \end{bmatrix} \quad (7)$$

$$= \begin{bmatrix} 1 & \Delta h_{12} & \Delta h_{13} \\ \Delta h_{21} & 1 & \Delta h_{23} \\ \Delta h_{31} & \Delta h_{32} & 1 \end{bmatrix} \begin{bmatrix} h_{11} & 0 & 0 \\ 0 & h_{22} & 0 \\ 0 & 0 & h_{33} \end{bmatrix}$$

$$\Delta h_{ij} = e^{j2\pi f \Delta d_{ij}/c} \quad (8)$$

In the present embodiment, in order to dynamically grasp the propagation path response H, the pilot signal is transmitted from each of the GW stations 70(1) to 70(3). In the following examples, although a case where a narrow-band pilot signal is used will be described, a spectrum-spread pilot signal spread spectrally using a plurality of spreading codes orthogonal to each other may be used, and the propagation path response may be estimated based on reception results of spectral inverse-spreading of the pilot signal.

Figure 18:
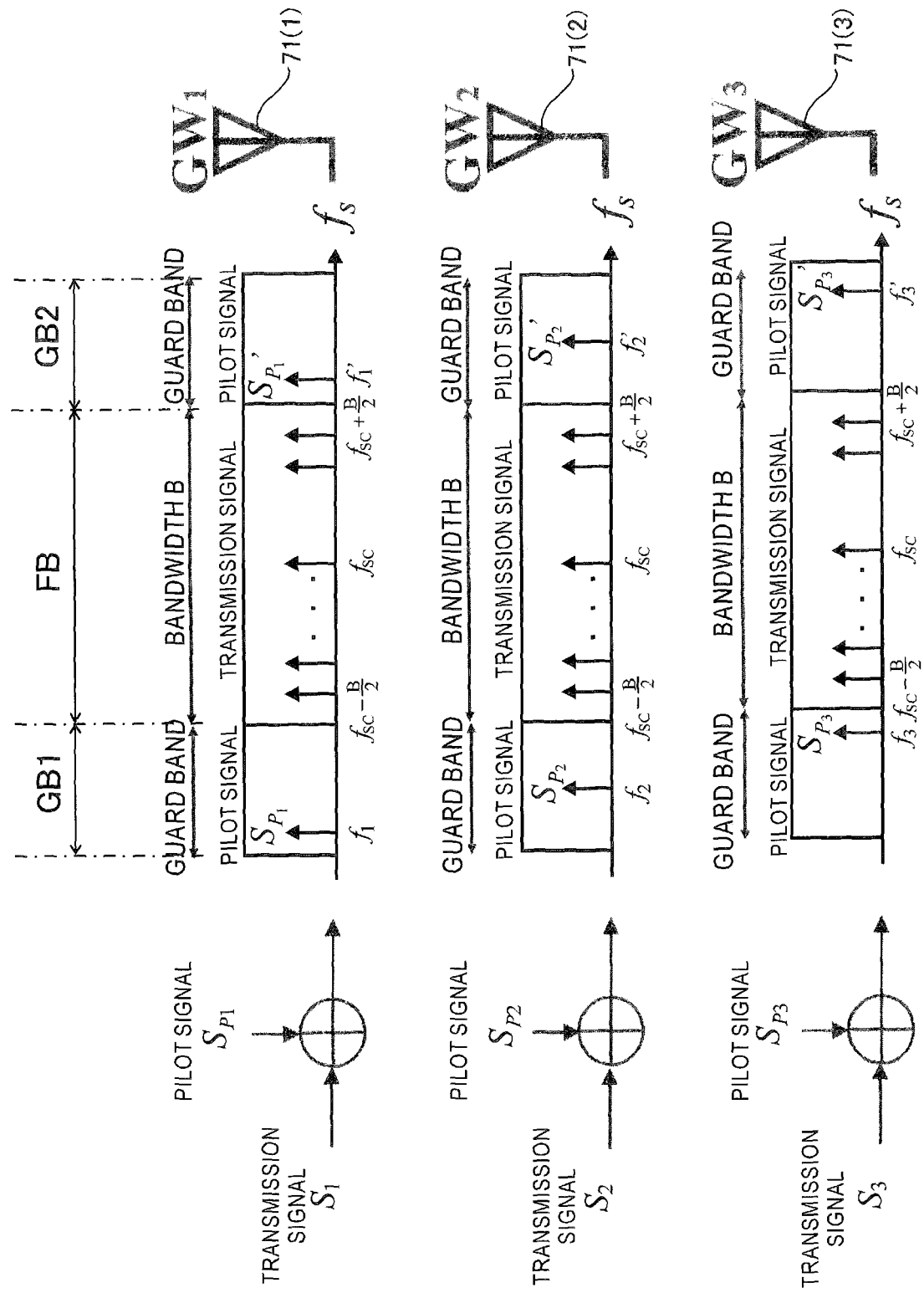
FIG. 18 is an illustration showing an example of a pilot signal in an uplink transmission signal band transmitted from each GW station.
Figure 19:
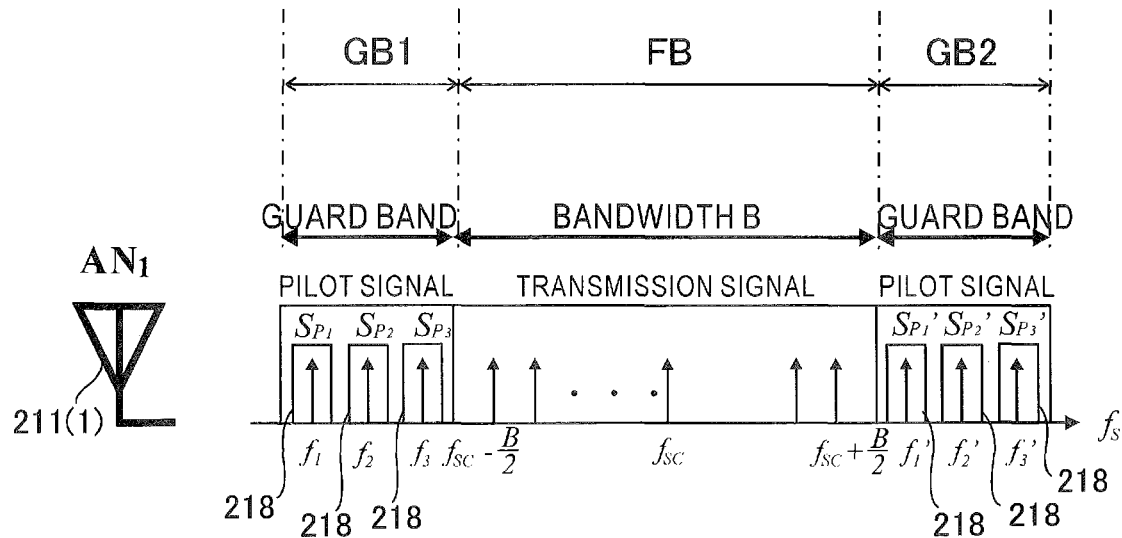
FIG. 19 is an illustration showing an example of a pilot signal in an uplink reception signal band received by the HAPS.
Figure 20:
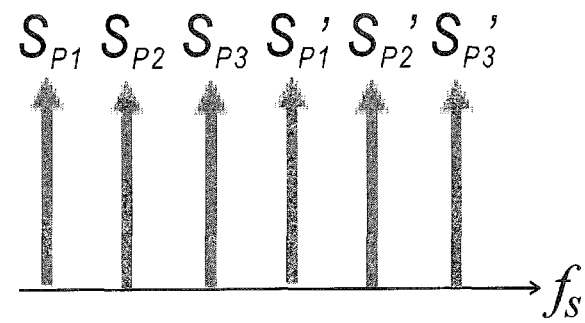
FIG. 20 is an illustration showing an example of pilot signals used for deriving a propagation path response.
Figure 21:
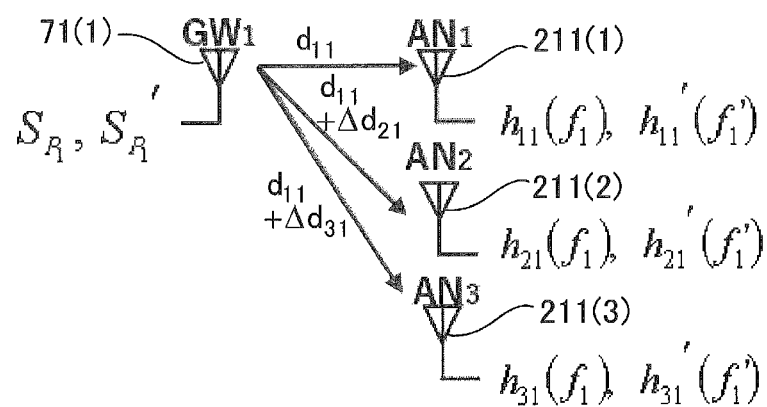
FIG. 21 is an illustration showing an example of a derivation model of a propagation path response of the feeder link.

FIG. 18 is an illustration showing an example of pilot signals in uplink-transmission signal bands transmitted from the GW stations 70(1) to 70(3). FIG. 19 is an illustration showing an example of pilot signals in uplink-reception signal bands received by the HAPS 20. FIG. 20 is an illustration showing an example of pilot signals separated by filters and used for deriving a propagation path response. FIG. 21 is an illustration showing an example of a derivation model of the propagation path response of the feeder link using the pilot signals of FIG. 18 to FIG. 20.

In the illustrated example, a plurality of pilot signals transmitted from each of the GW stations 70(1) to 70(3) are distributed and disposed in each of a first guard GB1 as a first adjacent band adjacent from low frequency side to the transmission signal band FB of the feeder link in which the desired signals $S_1$, $S_2$, and $S_3$ are transmitted from the GW stations 70(1) to 70(3), and a second guard band GB2 as a second adjacent band adjacent from high frequency side to the transmission signal band FB of the feeder link. Specifically, pilot signals $S_{P1}$, $S_{P2}$, and $S_{P3}$ with the same frequency and frequencies $f_1$, $f_2$, and $f_3$ different from each other transmitted from respective GW stations 70(1) to 70(3) are located in the first guard band GB1. Further, pilot signals $S_{P1}'$, $S_{P2}'$, and $S_{P3}'$ with frequencies $f_1'$, $f_2'$, and $f_3'$ different from each other transmitted from respective GW stations 70(1) to 70(3) are located in the second guard band GB2. The relay communication station 21 of the HAPS 20 separates the plural pilot signals $S_{P1}$, $S_{P2}$, and $S_{P3}$ of the first guard band GB1 received from the GW stations 70(1), 70(2) and 70(3) by a filter, and separates the plural pilot signals $S_{P1}'$, $S_{P2}'$, and $S_{P3}'$ of the second guard band GB2 received from the GW stations 70(1), 70(2) and 70(3) by a filter, respectively.

Next, the relay communication station 21 of the HAPS 20 separates respective pilot signals $S_{Pi}$ (i=1 to 3) from the reception signal by using a narrow-band reception filter 218 as shown in FIG. 18 (see FIG. 19), and obtains a propagation path response $h_{ki}$ from the k-th GW station 70(*k*) to the i-th FL antenna 211(*i*) of the HAPS 20 from the separated pilot signal $S_{Pi}$. The relay communication station 21 outputs the obtained information on the propagation path response $h_{ki}$ (see the following equations (9) and (10)) to the interference canceller section 220.

$$P_{ki} = h_{ki} S_{pi} \tag{9}$$

$$h_{ki} = \frac{P_{ki}}{S_{pi}} \tag{10}$$

For example, the pilot signals $h_{11}$, $h_{11}'$, $h_{21}$ and $h_{21}'$ received by the FL antennas 211(1) and 211(2) of the HAPS 20 are respectively represented by the following equations (11), (12), (13) and (14), and ratios $h_{21}/h_{11}$ and $h_{21}'/h_{11}'$ of these signals are respectively represented by the following equations (15) and (16).

$$h_{11} = |h_{11}|e^{j\theta_{11}} = |h_{11}|e^{j2\pi f_1 \frac{d_{11}}{c}} \tag{11}$$

$$h_{11}' = |h_{11}|e^{j\theta_{11}'} = |h_{11}|e^{j2\pi f_1' \frac{d_{11}}{c}} \tag{12}$$

$$h_{21} = |h_{21}|e^{j\theta_{21}} = |h_{21}|e^{j2\pi f_1 \frac{d_{11}+\Delta d_{21}}{c}} \tag{13}$$

$$h_{21}' = |h_{21}|e^{j\theta_{21}'} = |h_{21}|e^{j2\pi f_1' \frac{d_{11}+\Delta d_{21}}{c}} \tag{14}$$

$$\frac{h_{21}}{h_{11}} = \frac{|h_{21}|}{|h_{11}|} e^{j(\theta_{21}-\theta_{11})} = \frac{|h_{21}|}{|h_{11}|} e^{j2\pi f_1 \frac{\Delta d_{21}}{c}} \tag{15}$$

$$\frac{h_{21}'}{h_{11}'} = \frac{|h_{21}|}{|h_{11}|} e^{j(\theta_{21}'-\theta_{11}')} = \frac{|h_{21}|}{|h_{11}|} e^{j2\pi f_1' \frac{\Delta d_{21}}{c}} \tag{16}$$

In the above-described equations (11) to (16), $d_{11}$ is the path length between the GW station 70(1) and the FL antenna 211(1), and $\Delta d_{21}$ is the difference in path lengths (path differences) between the GW station 70(1) and respective FL antennas 211(1) and 211(2). The path length between the GW station 70(1) and the FL antenna 211(2) is represented by $d_{11}+\Delta d_{21}$.

The path difference $\Delta d_{21}$ can be obtained by the following equation (17), from the foregoing equations (15) and (16). It is noted that $\theta$ in the equation (17) is the phase difference obtained by adding the phase difference between $h_{11}'$ and $h_{11}$ and the phase difference between $h_{21}$ and $h_{21}'$. That is, $\theta$=(phase difference between $h_{11}'$ and $h_{11}$)+(phase difference between $h_{21}$ and $h_{21}'$).

$$e^{j2\pi(f_1 - f_1')\frac{\Delta d_{21}}{c}} = e^{j(\theta_{21}-\theta_{11}-\theta_{21}'+\theta_{11}')} \tag{17}$$

$$\Delta d_{21} = \frac{c}{2\pi(f_1 - f_1')}\theta$$

$$= \frac{c}{2\pi B}\theta$$

$$(\theta = \theta_{21} - \theta_{21}' + \theta_{11}' - \theta_{11})$$

Path difference $\Delta d_{31}$ between the GW station 70(1) and respective FL antennas 211(1) and 211(3), and other path differences $\Delta d_{12}$, $\Delta d_{13}$, $\Delta d_{23}$, and $\Delta d_{32}$ can be obtained in the same manner.

Using the path differences $\Delta d_{21}$, $\Delta d_{31}$, $\Delta d_{12}$, $\Delta d_{13}$, $\Delta d_{23}$, and $\Delta d_{32}$, the propagation path response $H_{fc}$ at the center frequency fsc of the transmission signal band of the feeder link can be estimated, for example, as in the $H_P$ of the following equation (18).

$$H_P = \begin{bmatrix} |h_{11}| & |h_{12}|e^{j2\pi f_{sc} \frac{\Delta d_{12}}{c}} & |h_{13}|e^{j2\pi f_{sc} \frac{\Delta d_{13}}{c}} \\ |h_{21}|e^{j2\pi f_{sc} \frac{\Delta d_{21}}{c}} & |h_{22}| & |h_{23}|e^{j2\pi f_{sc} \frac{\Delta d_{23}}{c}} \\ |h_{31}|e^{j2\pi f_{sc} \frac{\Delta d_{31}}{c}} & |h_{32}|e^{j2\pi f_{sc} \frac{\Delta d_{32}}{c}} & |h_{33}| \end{bmatrix} \tag{18}$$

In case that each of the GW stations 70(1) to 70(3) transmits plural pilot signals as shown in FIG. 18 and FIG. 19, it is possible to detect the path difference equal to or more than wavelengths $\lambda_1$, $\lambda_2$, and $\lambda_3$ of respective pilot signal. For example, assuming the LTE, the bandwidth B of the transmission signal band FB of the feeder link is 18 MHz, so that $\Delta d_{21}$ can be estimated in the range within the wavelength of the pilot-frequency difference B as shown in the foregoing equation (17). In the present example, it is possible to accurately estimate up to the range of $0<\Delta d_{21}<16$ [m], which is a range required for implementation.

In the examples of FIG. 18 and FIG. 19, since the plural pilot signals $S_{P1}$, $S_{P2}$, and $S_{P3}$ and pilot signals $S_{P1}'$, $S_{P2}'$, and $S_{P3}'$ having the frequencies $f_1$, $f_2$, $f_3$, $f_4'$, $f_2'$, and $f_3'$ different from each other transmitted from respective GW stations 70(1) to 70(3) are evenly distributed and disposed in the first guard band GB1 and the second guard band GB2, each pilot signal can be separated by a filter and easily detected individually.

Using the matrix $H_{fc}$ of the propagation path response ($H_P$ of the foregoing equation (18)), a weight used for the interference canceller can be calculated by, for example, the ZF (Zero-Forcing) method or the MMSE (Minimum Mean Square Error) method using the matrix of the propagation path response.

For example, in the ZF method, the weight W can be obtained by the inverse matrix of the matrix $H_{fc}$ of the propagation path response as in the following equation (19).

$$W = H_{fc}^{-1} \tag{19}$$

In the MMSE method, the weight W can be obtained by the following equation (20). Herein, $N_T$ is the number of transmission antennas and γ is SNR.

$$W = \left(H_{fc}^H H_{fc} + \frac{N_T I_{N_r}}{\gamma}\right)^{-1} H_{fc}^H \quad (20)$$

By using the weight W, the interference canceller section 220 can convert the reception signal Y of the following equation (21) to a demodulation signal E of the following equation (22) in which the interference signal is canceled, and output the signal. The interference canceller section 220 stores the values of respective elements of the matrix of the weight W in the equation (22) as W table data.

$$Y = \begin{bmatrix} y_1 \\ y_2 \\ y_3 \end{bmatrix} = \begin{bmatrix} h_{11}s_1 + h_{12}s_2 + h_{13}s_3 \\ h_{21}s_1 + h_{22}s_2 + h_{23}s_3 \\ h_{31}s_1 + h_{32}s_2 + h_{33}s_3 \end{bmatrix} \quad (21)$$

$$E = WY \quad (22)$$

$$\begin{bmatrix} e_1 \\ e_2 \\ e_3 \end{bmatrix} = \begin{bmatrix} 1 & \Delta h_{12} & \Delta h_{13} \\ \Delta h_{21} & 1 & \Delta h_{23} \\ \Delta h_{31} & \Delta h_{32} & 1 \end{bmatrix}^{-1} \begin{bmatrix} y_1 \\ y_2 \\ y_3 \end{bmatrix}$$

Next, a tracking of the GW station by the FL antenna of the HAPS 20, a switching of the combination of the FL antenna and the GW station (hereinafter, also referred to as "antenna switching"), and a mitigation of interference-reduction performance degradation between feeder links when performing the antenna switching in the multiple-GW system of the present embodiment will be described.

In the multiple-GW system of the present embodiment, if the airframe of the HAPS 20 moves or rotates in the upper airspace, the direction of the directional beam (main beam) of the FL antenna of the HAPS 20 may shift from the direction toward the GW station (GW antenna), and the communication quality of the feeder link may deteriorate. In order to suppress the deterioration of the communication quality of the feeder link due to the movement or rotation of the HAPS 20, each of the plural FL antennas of the HAPS 20 may track the GW station (GW antenna) of the corresponding communication destination, and the antenna switching to switch the combination of the plural FL antennas and plural GW stations (GW antennas) may be performed.

Figure 22C:
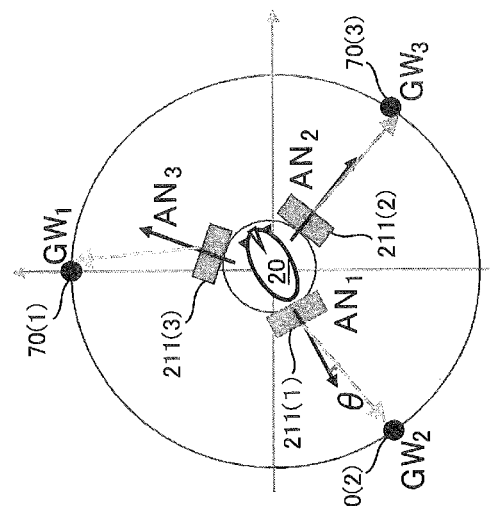
FIG. 22C is an illustration showing an example of tracking a GW station by a FL antenna, and antenna switching which switches a combination of a FL antenna and a GW station when an airframe of HAPS rotates in a multiple-GW system according to an embodiment.
Figure 22B:
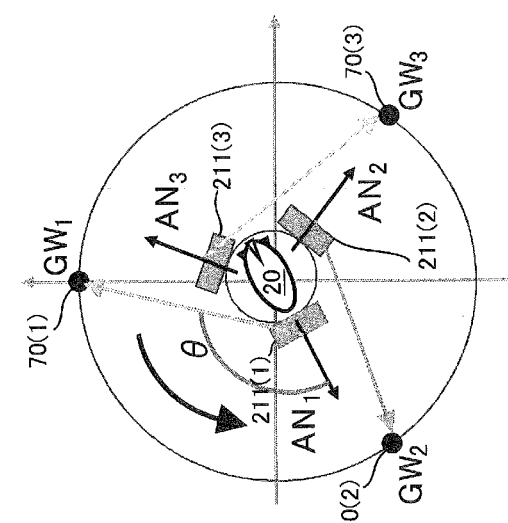
FIG. 22B is an illustration showing an example of tracking a GW station by a FL antenna, and antenna switching which switches a combination of a FL antenna and a GW station when an airframe rotation of HAPS rotates in a multiple-GW system according to an embodiment.
Figure 22A:
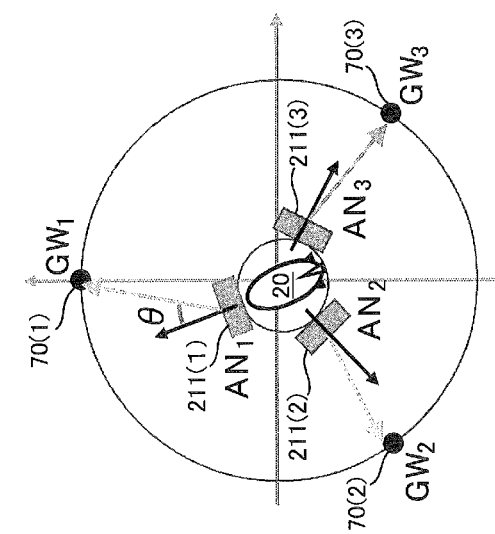
FIG. 22A is an illustration showing an example of tracking a GW station by a FL antenna, and antenna switching which switches a combination of a FL antenna and a GW station when an airframe rotation of HAPS rotates in a multiple-GW system according to an embodiment.

FIG. 22A to FIG. 22C are illustrations showing an example of tracking of the GW station by the FL antenna and antenna switching for switching the combination of the FL antenna and the GW station when the airframe of the HAPS rotates in the multiple-GW system according to the embodiment.

FIG. 22A shows a state before the airframe of the HAPS 20 rotates. Each of the directional beams (main beams) of the FL antennas 211(1) to 211(3) of the HAPS 20 faces the direction of the GW station 70 of the communication destination that is performing a feeder link communication. The θ in the figure is a tilt angle of the direction of the directional beam with respect to the direction perpendicular to the antenna main surface (for example, the plane of the planar array antenna) of the FL antennas 211(1) to 211(3).

When the airframe of the HAPS 20 rotates in the left rotation direction in the figure, the directional beam of each of the FL antenna 211(1) to 211(3) is controlled to rotate in the right rotation direction in the figure so as to continuously direct in the direction of the GW station 70 of the communication destination as shown in FIG. 22B.

When the airframe of the HAPS 20 rotates in the left rotation direction in the figure, the directional beam of each of the FL antenna 211(1) to 211(3) is controlled to rotate in the right rotation direction in the figure so as to continuously direct in the direction of the GW station 70(1) of the communication destination as shown in FIG. 22B.

When the tilt angle θ of the directional beam of each of the FL antenna 211(1) to 211(3) becomes larger than a predetermined angle threshold value θth, the communication quality of the feeder link by each FL antenna deteriorates, so that the combination of the FL antennas 211(1) to 211(3) and the GW stations 70(1) to 70(3) (GW antennas), which respectively communicate with each other by the feeder link, is switched as shown in FIG. 22C. In the example of FIG. 22C, for example, the FL antenna combined with the first GW station 70(1) is switched from the first FL antenna 211(1) to the third FL antenna 211(3).

In the multiple-GW system of the present embodiment, when the combination of the plural FL antennas of the HAPS 20 and the plural GW stations (GW antennas) changes, the weight used for suppressing the interference between feeder links in the interference canceller section changes significantly. Therefore, when switching the combination of the FL antennas 211(1) to 211(3) and the GW stations 70(1) to 70(3) (GW antennas), it is also necessary to switch the weight (weight matrix).

Figure 23:
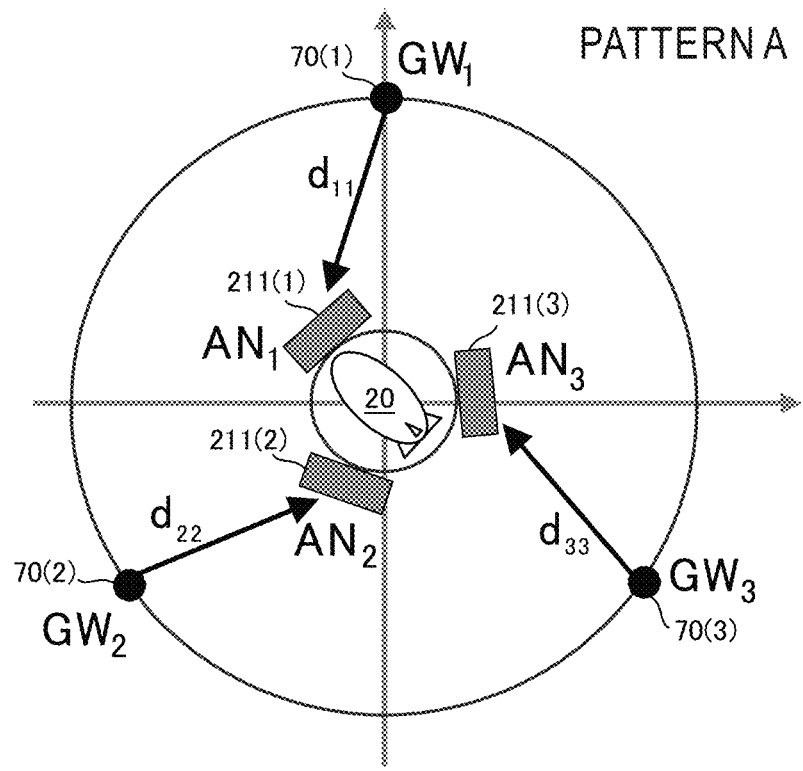
FIG. 23 is an illustration showing an example of a first combination pattern (pattern A) of a FL antenna of HAPS and a GW station and a reference path defined by a calculation of weight in the pattern A, in a multiple-GW system according to an embodiment.
Figure 23:
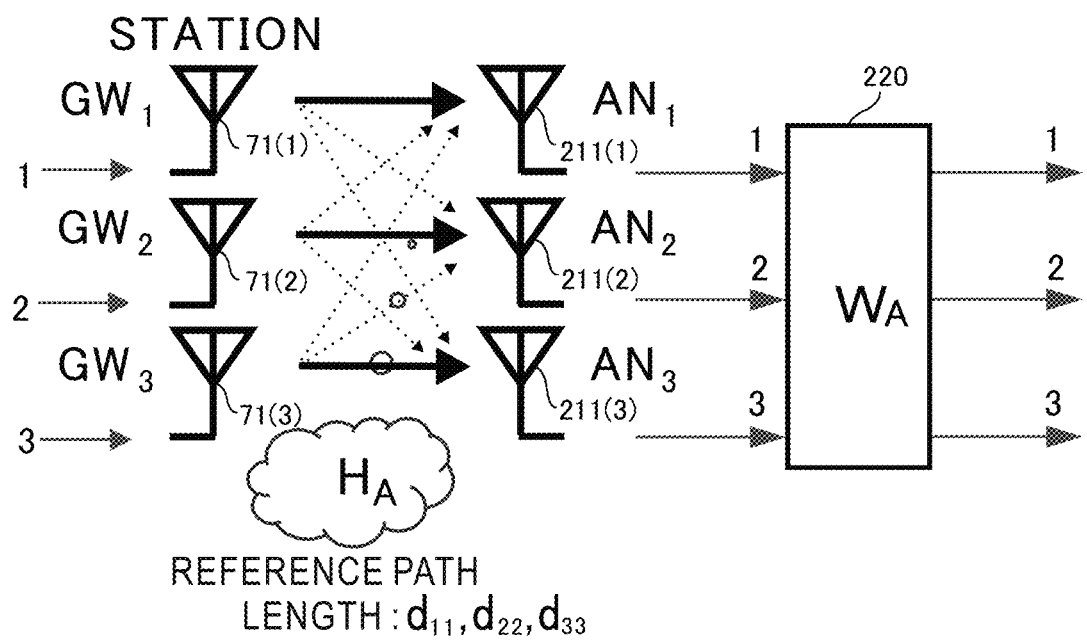
Figure 24:
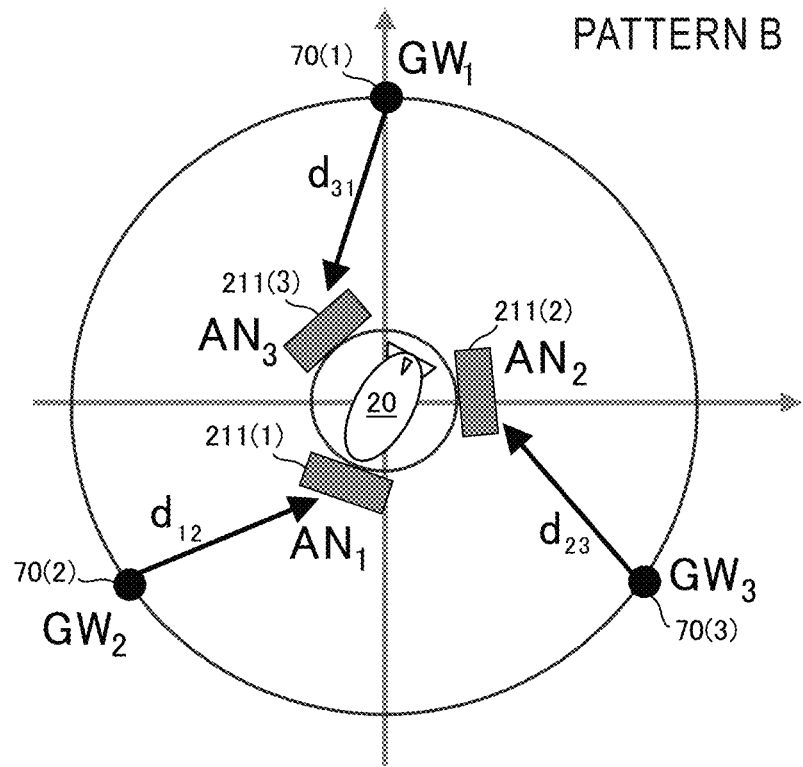
FIG. 24 is an illustration showing an example of a second combination pattern (pattern B) of a FL antenna of HAPS and a GW station and a reference path defined by a calculation of weight in the pattern B, in a multiple-GW system according to an embodiment.
Figure 24:
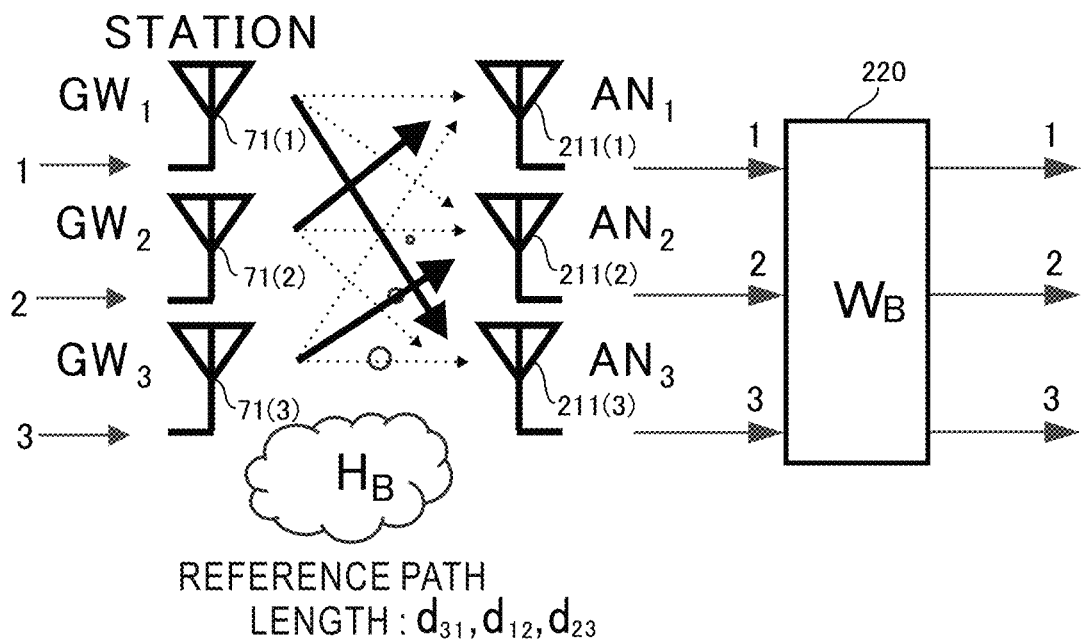
Figure 25:
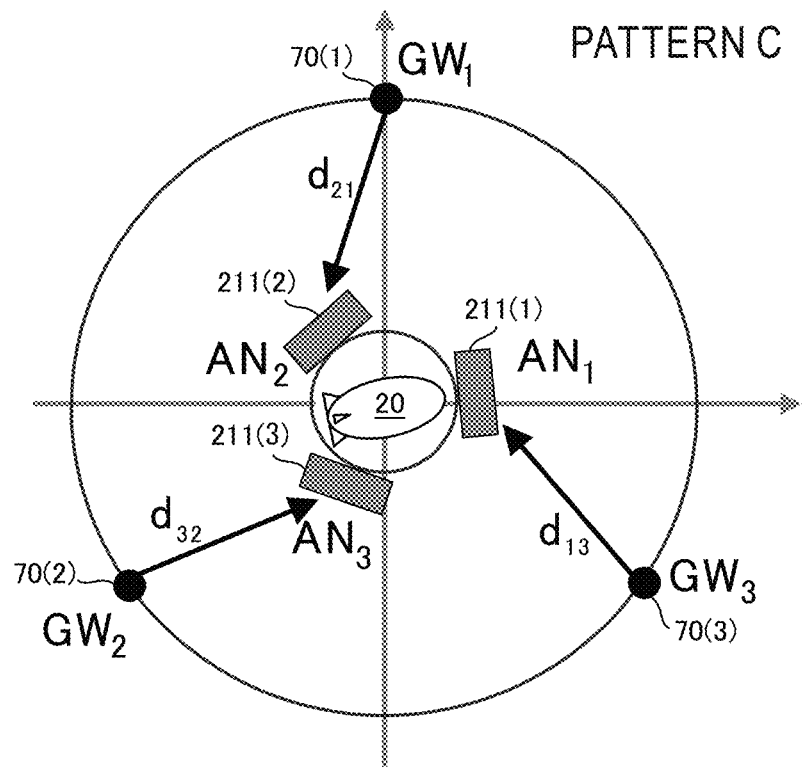
FIG. 25 is an illustration showing an example of a third combination pattern (pattern C) of a FL antenna of HAPS and a GW station and a reference path defined by a calculation of weight in the pattern C, in a multiple-GW system according to an embodiment.
Figure 25:
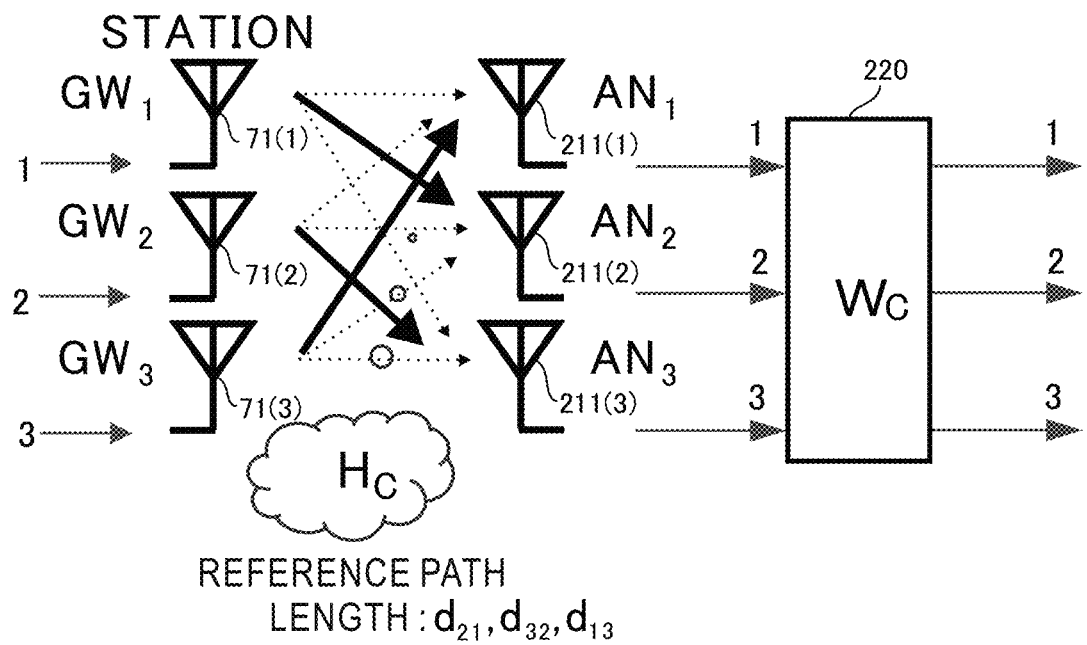

Each of FIG. 23, FIG. 24 and FIG. 25 is an illustration showing an example of three types of combination patterns (patterns A, B, C) of the plural FL antennas 211(1) to 211(3) of the HAPS 20 and the plural GW stations 70(1) to 70(3) (GW antennas), and referent paths defined in the calculation of the weight (weight matrix) in each of the patterns.

In pattern A of FIG. 23, a propagation path response HA is estimated with the path length $d_{11}$ from the GW station 70(1) to the FL antenna 211(1), a path length $d_{22}$ from the GW station 70(2) to the FL antenna 211(2) and a path length $d_{33}$ from the GW station 70(3) to the FL antenna 211(3) as reference path lengths, respectively, and a weight WA used for the suppression process of the interference between feeder links is calculated based on the propagation path response HA.

In pattern B of FIG. 24, a propagation path response $H_B$ is estimated with the path length $d_{31}$ from the GW station 70(1) to the FL antenna 211(3), a path length $d_{12}$ from the GW station 70(2) to the FL antenna 211(1) and a path length $d_{23}$ from the GW station 70(3) to the FL antenna 211(2) as reference path lengths, respectively, and a weight WB used for the suppression process of the interference between feeder links is calculated based on the propagation path response $H_B$.

In pattern C of FIG. 25, a propagation path response $H_C$ is estimated with the path length $d_{21}$ from the GW station 70(1) to the FL antenna 211(2), a path length $d_{32}$ from the GW station 70(2) to the FL antenna 211(3) and a path length $d_{13}$ from the GW station 70(3) to the FL antenna 211(1) as reference path lengths, respectively, and a weight $W_C$ used for the suppression process of the interference between feeder links is calculated based on the propagation path response $H_C$.

Since the reference path lengths are different from each other in the three types of patterns A, B, and C, the weights W ($W_A$, $W_B$, $W_C$) used when converting the reception signal Y into the demodulation signal E by suppressing the interference between the feeder links are significantly different. For example, in the weight of the foregoing equation (22) for converting the reception signal Y to the demodulation signal E, the path difference $\Delta d_{21}$ included in a matrix element $\Delta h21$ of the following equation (23) changes significantly when the pattern changes as shown in the following equation (24). Therefore, it is necessary to use appropriate weights $W_A$, $W_B$, and $W_C$ (weight matrixes) according to the patterns A, B, and C.

$$\Delta h_{21} = e^{j2\pi f \Delta d_{21}/c} \quad (23)$$

$$\text{PATTERN } A: \Delta d_{21} = d_{21} - d_{11} \quad (24)$$

$$\text{PATTERN } B: \Delta d_{21} = d_{22} - d_{12}$$

$$\text{PATTERN } C: \Delta d_{21} = d_{23} - d_{13}$$

The interference canceller section 220 stores a value of each element of each matrix of the weights $W_A$, $W_B$, and $W_C$ corresponding to the patterns A, B, and C as a $W_A$ table, $W_B$ table and $W_C$ table.

Figure 26:
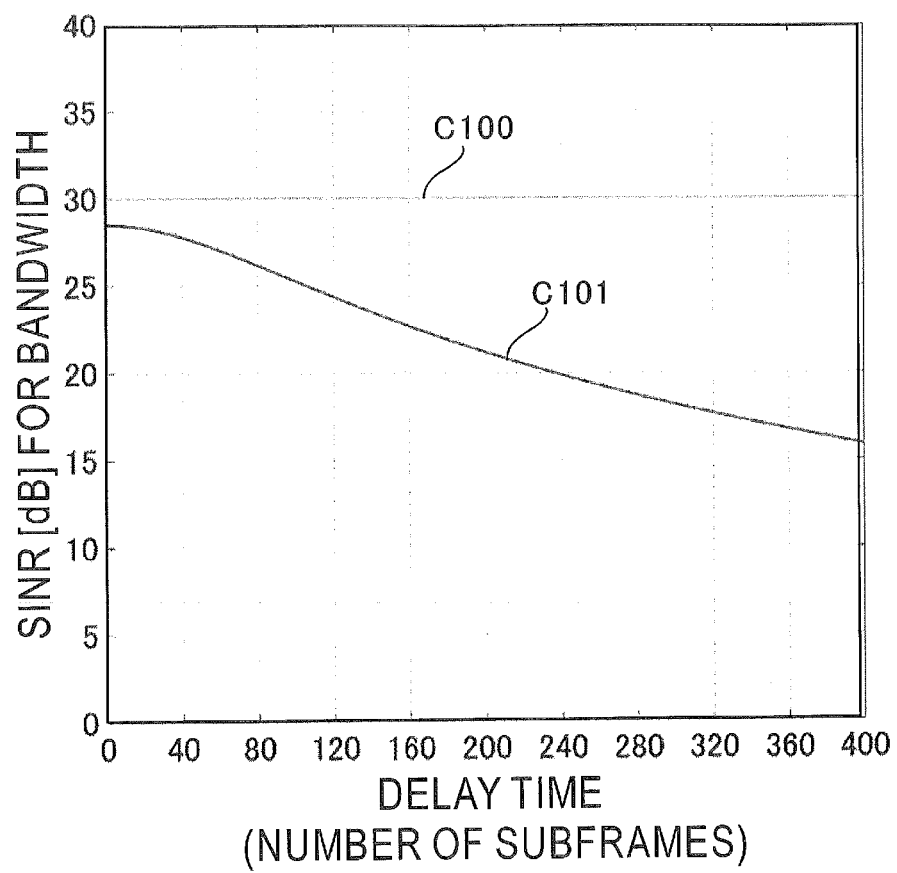
FIG. 26 is a graph showing an example of time variation of an interference reduction performance between multi-feeder links in case that an antenna switching is not performed during an airframe rotation of HAPS in a multiple-GW system according to an embodiment.
Figure 27:
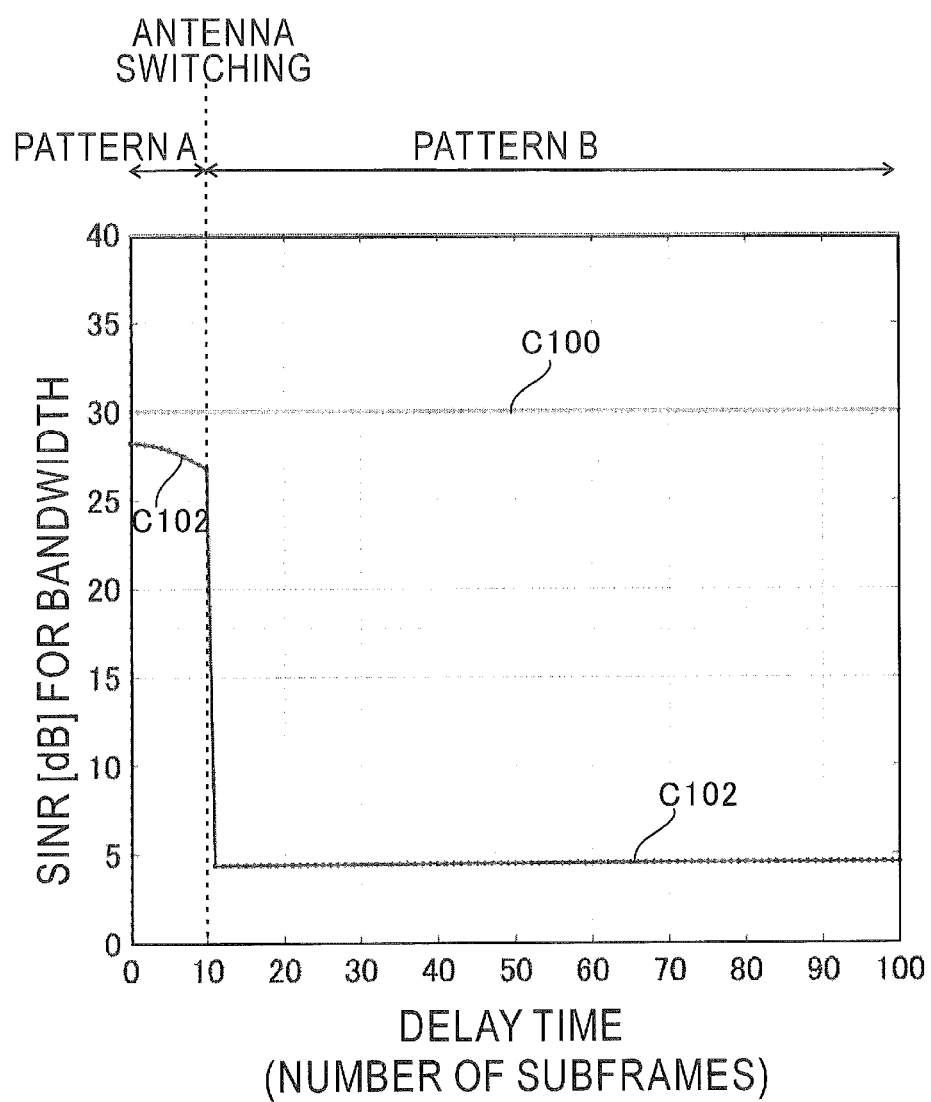
FIG. 27 is a graph showing an example of time variation of an interference reduction performance between multi-feeder links in case that an antenna switching is performed during an airframe rotation of HAPS in a multiple-GW system according to an embodiment.

FIG. 26 is a graph showing an example of a time variation of the interference reduction performance between the multi-feeder links in case that the antenna switching is not performed during the airframe rotation of the HAPS 20 in the multiple-GW system according to the embodiment. FIG. 27 is a graph showing an example of a time variation of the interference reduction performance between the multi-feeder links in case that the antenna switching from the pattern A to the pattern B is performed during the airframe rotation of the HAPS 20 in the multiple-GW system according to the embodiment. Both FIG. 26 and FIG. 27 are results of computer simulation. In FIG. 26 and FIG. 27, the vertical axis is SINR [dB] for the bandwidth in the demodulation signal E outputted from the interference canceller section 220, and the horizontal axis is a calculation-processing delay time (number of subframes) of the weight W in the interference canceller section 220. The straight line C100 in the figure is SINR [dB] for an ideal bandwidth in case that there is no error in the propagation path response H (no error in the calculation of the path difference) due to the calculation processing delay of the weight W in the interference canceller section 220.

In case that the antenna switching of FIG. 26 is not performed, as shown by the curve C101 in the figure, the interference reduction performance is gradually lowered by the error of the propagation path response H (error of the calculation of the path difference) due to the calculation processing delay of the weight W, and the SINR [dB] is gradually deteriorated.

On the other hand, in case that the antenna switching of FIG. 27 is performed, as shown by the curve C102 in the figure, the interference reduction performance is sharply lowered immediately after the antenna switching from the pattern A to the pattern B is performed, and the SINR [dB] is sharply deteriorated. It was found that the sudden decrease in the interference reduction performance occurs because the weight $W_A$ ($W_A$ table) of the pattern A before the antenna switching is used immediately after the antenna switching to the pattern B due to the calculation-processing delay time t (for example, processing delay of several 100 ms to several s) of the weight WB even though it was switched to the pattern B by the antenna switching.

Therefore, in the present embodiment, for all three types of combination patterns (patterns A, B, C) of the plural FL antennas 211(1) to 211(3) of the HAPS 20 and the plural GW stations 70(1) to 70(3) (GW antennas) that may be generated by at least one of the movement and rotation of the HAPS 20, the weights $W_A$, $W_B$ and $W_C$ corresponding to each pattern A, B, and C are calculated in advance and stored as the $W_A$ table, $W_B$ table and $W_C$ table. When the combination pattern changes due to at least one of the movement and rotation of the HAPS 20, the calculation result (W table) of the weight of the combination pattern corresponding to the changed combination is selected, and the process of suppressing the interference between feeder links when transmitting and receiving relay signals is performed based on the calculation result (W table) of the weight of the selected combination pattern.

Figure 28:
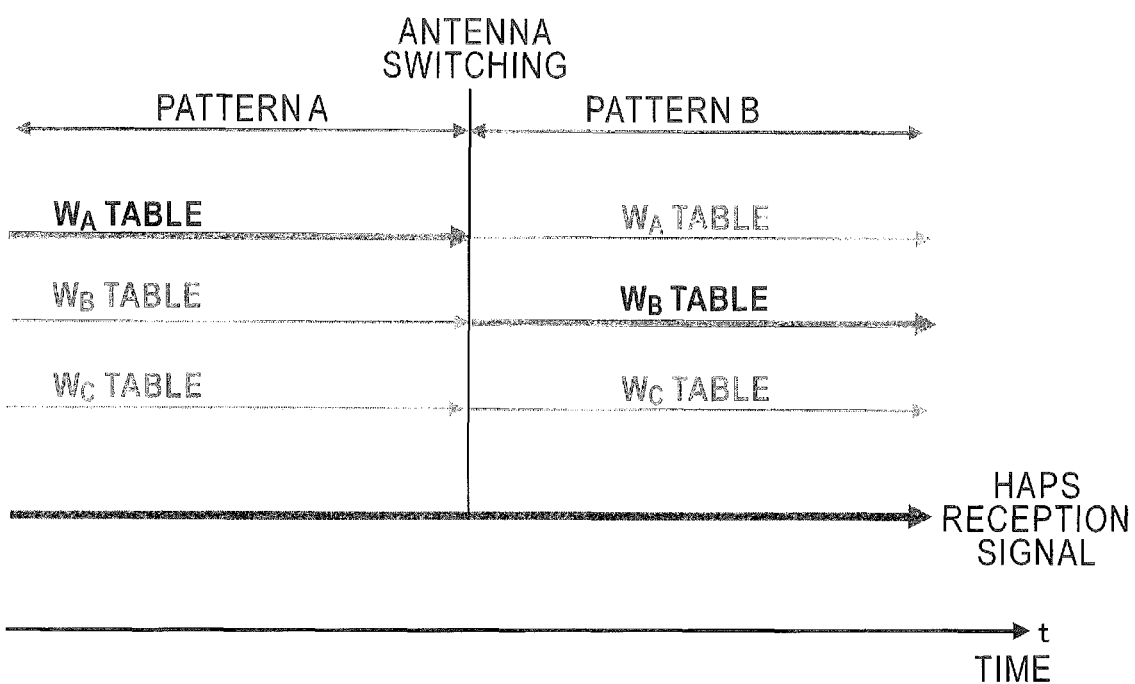
FIG. 28 is an illustration showing an example of selection/switch of a weight (W) table when performing an antenna switching from pattern A to pattern B in a multiple-GW system according to an embodiment.

For example, when the antenna switching from the pattern A to the pattern B is performed as shown in FIG. 28, in the interference canceller section 220, the $W_B$ table corresponding to the pattern B is selected from the plural W tables stored in advance, and the W table used for conversion from the reception signal Y to the demodulation signal E accompanied by the interference suppression process is switched from the $W_A$ table to the $W_B$ table. By the switching of this W table, the $W_B$ table corresponding to the pattern B can be used immediately after the antenna switching even if there is the calculation-processing delay time t of the weight W in the interference canceller section 220, so that the sharp decrease of the interference reduction performance (see FIG. 27) can be mitigated.

Since the $W_A$ table of the pattern A is used before the antenna switching in FIG. 28, a demodulation signal S' is represented by, for example, the following equation (25). Immediately after the antenna switching to the pattern B, since the $W_B$ table of the pattern B stored in advance is selected and used, the demodulation signal S' is, for example, only the deviation of the path difference in the pattern B as shown in the following equation (26), and there is no sharp decrease in the interference reduction performance between feeder links, and the decrease in the interference reduction performance can be mitigated. On the other hand, in case that the WA table is continued to be used due to the calculation-processing delay time t of the weight W immediately after the antenna switching to the pattern B, as shown in the following equation (27), the demodulation signal S' is converted using the $W_A$ table of the pattern A before the antenna switching and the demodulation signal S' is outputted, so that the sharp decrease in the interference reduction performance between feeder links occurs.

$$S' = W_A(t-\tau)Y_A(t) \quad (25)$$

$$S' = W_B(t-\tau)Y_B(t) \quad (26)$$

$$S' = W_A(t-\tau)Y_B(t) \quad (27)$$

The timing of the antenna switching from the pattern A to the pattern B can be determined based on connection-GW information on the plural GW stations 70(1) to 70(3) to which the relay communication station 21 of the HAPS 20 is connected via the FL antennas 211(1) to 211(3).

The plural weights (W tables) calculated and stored in advance in the interference canceller section 220 may be calculated for each of the patterns A, B and C in the vicinity of each of the plural antenna switching timings. In this case, the weight (W table) selected and used immediately after the antenna switching becomes close to the weight (W table) corresponding to the actual path length (path difference), and the interference reduction performance between feeder links immediately after the antenna switching can be improved.

Figure 29:
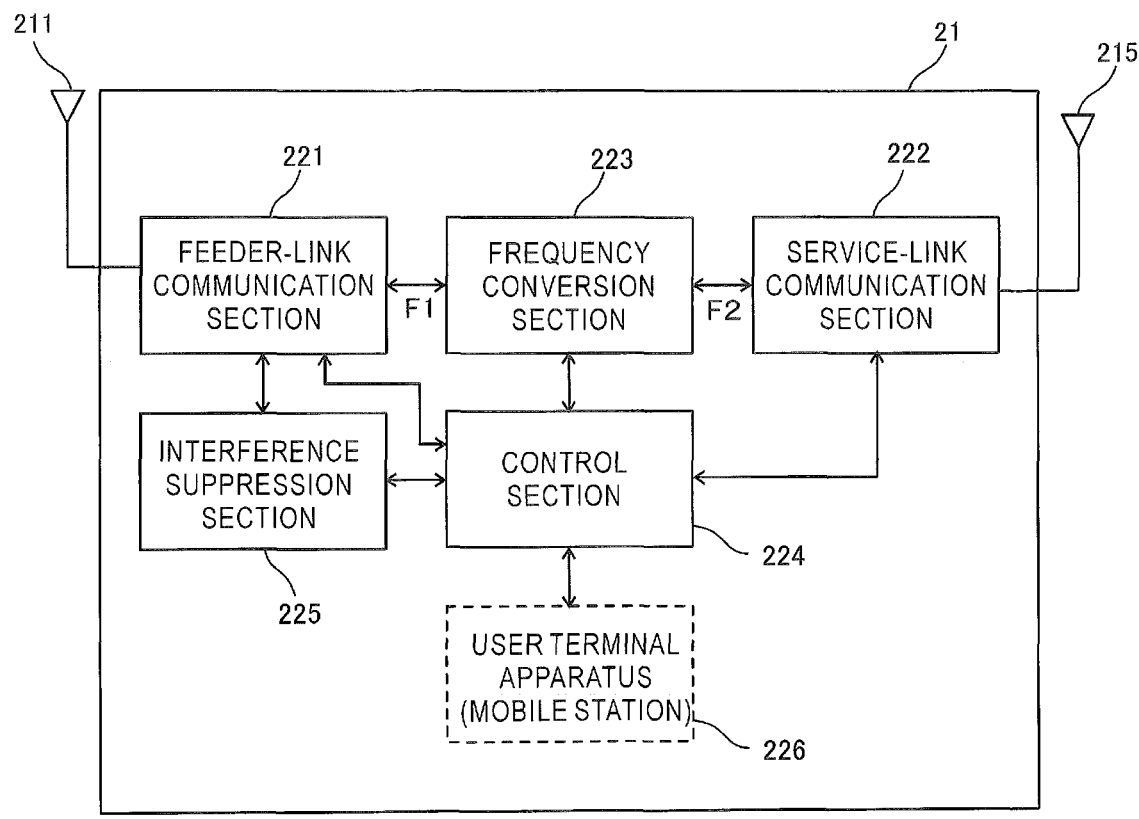
FIG. 29 is an illustration showing an example of a main configuration of a relay communication station in HAPS according to an embodiment.

FIG. 29 is an illustration showing an example of a main configuration of the relay communication station 21 of the HAPS 20 according to the present embodiment. In FIG. 29, the relay communication station 21 is provided with a feeder-link communication section 221, a service-link communication section 222, a frequency conversion section 223, a control section 224 for controlling each section, and an interference suppression section 225.

The feeder-link communication section 221 is provided with plural receivers corresponding to the number of GW stations 70 (the number of FL antennas 211), and transmits and receives a radio signal of a first frequency F1 for feeder link to and from the GW station 70 via the FL antenna 211.

The plural receivers of the feeder-link communication section 221 receive plural pilot signals transmitted from each of the plural GW stations 70(1) to 70(3), and separate a group of pilot signals in which the plural pilot signals overlap by a filter. Each receiver outputs plural pilot signals separated by the filter to the interference suppression section 225 as a reception result of the pilot signals $h_{ki}$ propagating in the propagation path of the feeder link.

The service-link communication section 222 transmits and receives a radio signal of a second frequency F2 for service link to and from the terminal apparatus 61 via an antenna for service link 115. The frequency conversion section 223 performs a frequency conversion between the first frequency F1 and the second frequency F2 between the feeder-link communication section 221 and the service-link communication section 222. The radio signal relayed by the relay communication station 21 may be transmitted and received, for example, by using an OFMDA communication method compliant with the LTE or LTE-Advanced standard. In this case, good communication quality can be maintained even if the delay of the radio signal occurs in different multipaths.

The control section 224 can control each section by executing a program incorporated in advance.

The interference suppression section 225 performs the estimation of the propagation path response, the calculation of the weight and the interference-cancellation signal processing described above, based on the reception result ($h_{ki}$) of the plural pilot signals outputted from the feeder-link communication section 221 by executing a program incorporated in advance.

In the case of receiving control information from a remote control apparatus (control source) of a communication operator of a mobile communication network or transmitting information to the remote control apparatus, a user terminal (mobile station) 226 connected to the control section 224 may be provided. The control section 224 may, for example, receive the control information transmitted from the remote control apparatus by the user terminal (mobile station) 226, and control each section based on the control information. Herein, the communication between the remote control apparatus and the user terminal (mobile station) 226 may be performed using, for example, an IP address (or telephone number) assigned to each of the remote control apparatus and the user terminal (mobile station) 226.

As described above, according to the present embodiment, it is possible to dynamically suppress the interference between the plural feeder links in the multi-feeder link of the same frequency between the HAPS 20 and the plural GW stations 70(1) to 70(3).

In particular, according to the present embodiment, when the combination of the plural FL antennas 211(1) to 211(3) mounted on the HAPS 20 and the plural GW stations 70(1) to 70(3) changes in the multiple-GW system, it is not necessary to calculate the weight corresponding to the changed combination pattern, so that the deterioration of the interference reduction performance between the multi-feeder links due to the weight processing delay can be mitigated.

Further, according to the present embodiment, since the path difference between the HAPS 20 and the plural GW stations 70(1) to 70(3) required for dynamic suppression of interference in the multi-feeder links can be estimated and grasped to the range required for implementing, the interference in the multi-feeder links can be suppressed accurately.

In the above embodiment, although the case where it is applied to the forward link of the feeder link of the HAPS 20 has been described, the present invention can also be applied to the reverse link of the feeder link to improve the frequency utilization efficiency of the feeder link while suppressing the decrease of SINR in the reverse link.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, relay communication station, feeder station, gateway station, base station, base station apparatus, relay-communication station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20 HAPS (communication relay apparatus)
21 relay communication station
61 terminal apparatus
70, 70(1) to 70(3) gateway station (GW station)
71, 71(1) to 71(3) antenna for feeder link (GW antenna)
200C, 200C(1) to 200C(7) three dimensional cell
200F, 200F(1) to 200F(7) foot print
211, 211(1) to 211(3) antenna for feeder link (FL antenna)
212, 212(1) to 212(3) antenna directional beam
215 antenna for service link (SL antenna)
220 interference canceller section
221 feeder-link communication section
222 service-link communication section
223 frequency conversion section
224 control section
225 interference suppression section

The invention claimed is:

1. A system comprising an aerial-staying type communication relay apparatus that has a relay communication station for relaying a radio communication of a terminal apparatus and plural antennas for feeder link, and plural gateway stations that are time-synchronized with each other and transmit and receive relay signals different from each other at a same frequency in a feeder link between the relay communication station of the aerial-staying type communication relay apparatus, the system comprising:
means for calculating a weight for suppressing an interference between feeder links with respect to each of plural combination patterns of the plural antennas for feeder link and the plural gateway stations, and storing plural calculation results of weight tables for the plural combination patterns, each weight table including plural weights for each of the plural combination pattern;
means for selecting a calculation result of one of the weight tables for the combination pattern from the plural calculation results of the weight tables for the plural combination patterns, when the combination of the plural antennas for feeder link and the plural gateway stations changes due to at least one of the rotation and movement of the aerial-staying type communication relay apparatus, the selected calculation result of the one of the weight tables for the combination pattern corresponding to the combination of the plural antennas for feeder link and the plural gateway stations after changing; and
means for suppressing an interference between feeder links when transmitting and receiving relay signals between the relay communication station and the plural gateway stations based on the selected calculation result of the weight of the combination pattern.

2. The system according to claim 1, comprising:
means for tracking a gateway station of a communication destination of a feeder link by changing an angle of a directional beam of each of the plural antennas for feeder link; and
means for switching the gateway station of the communication destination of the feeder link, the gateway station communicating with each of the plural antennas for feeder link communicates, when an amount of change in the angle of at least one of the directional beams of the plural antennas for feeder link becomes larger than a predetermined threshold value.

3. The system according to claim 1,
wherein, with respect to each of the plural combination patterns, the system estimates propagation path responses between the plural antennas for feeder link and the plural gateway stations based on reception results of plural pilot signals transmitted and received between the plural antennas for feeder link and the plural gateway stations, and calculates plural weights respectively corresponding to the plural gateway stations based on the plural propagation path responses.

4. The system according to claim 1,
wherein the system suppresses interferences between feeder links in plural forward links for transmitting relay signals from the plural gateway stations to the relay communication station, based on the selected calculation result of the one of the weight tables for the combination pattern.

5. The system according to claim 1,
wherein the system suppresses interferences between feeder links in plural reverse links for transmitting relay signals from the relay communication station to the plural gateway stations, based on the selected calculation result of the one of the weight tables for the combination pattern.

6. The system according to claim 2,
wherein, with respect to each of the plural combination patterns, the system estimates propagation path responses between the plural antennas for feeder link and the plural gateway stations based on reception results of plural pilot signals transmitted and received between the plural antennas for feeder link and the plural gateway stations, and calculates plural weights respectively corresponding to the plural gateway stations based on the plural propagation path responses.

7. The system according to claim 2,
wherein the system suppresses interferences between feeder links in plural forward links for transmitting relay signals from the plural gateway stations to the relay communication station, based on the selected calculation result of the one of the weight tables for the combination pattern.

8. The system according to claim 2,
wherein the system suppresses interferences between feeder links in plural reverse links for transmitting relay signals from the relay communication station to the plural gateway stations, based on the selected calculation result of the one of the weight tables for the combination pattern.

9. A relay communication station that is incorporated in an aerial-staying type communication relay apparatus and relays radio communication of a terminal apparatus, comprising:
a feeder-link communication section for transmitting and receiving relay signals different from each other at a same frequency in feeder links between the relay communication station and plural gateway stations that are time-synchronized with each other; and
an interference suppression section for suppressing interference between plural feeder links that are formed between the relay communication station and the plural gateway stations, and
wherein the interference suppression section:
calculates a weight for suppressing an interference between feeder links with respect to each of plural combination patterns of the plural antennas for feeder link and the plural gateway stations, and stores plural calculation results of weight tables for the plural combination patterns, each weight table including plural weight for each of the plural combination pattern;
selects a calculation result of one of the weight tables for the combination pattern from the plural calculation results of the weight tables for plural combination patterns, when the combination of the plural antennas for feeder link and the plural gateway stations changes due to at least one of the rotation and movement of the aerial-staying type communication relay apparatus, the selected calculation result of the one of the weight tables for the combination pattern corresponding to the combination of the plural antennas for feeder link and the plural gateway stations after changing; and
suppresses an interference between feeder links when transmitting and receiving relay signals between the relay communication station and the plural gateway stations based on the selected calculation result of the weight of the combination pattern.

10. The relay communication station according to claim 9, comprising:
means for tracking a gateway station of a communication destination of a feeder link by changing an angle of a directional beam of each of the plural antennas for feeder link; and
means for switching the gateway station of the communication destination of the feeder link, the gateway station communicating with each of the plural antennas for feeder link communicates, when an amount of change in the angle of at least one of the directional beams of the plural antennas for feeder link becomes larger than a predetermined threshold value.

11. The relay communication station according to claim 9,
wherein, with respect to each of the plural combination patterns, the interference suppression section estimates propagation path responses between the plural antennas for feeder link and the plural gateway stations based on reception results of plural pilot signals transmitted and received between the plural antennas for feeder link and the plural gateway stations, and calculates plural weights respectively corresponding to the plural gateway stations based on the plural propagation path responses.

12. The relay communication station according to claim 9,
wherein the interference suppression section suppresses interferences between feeder links in plural forward links for transmitting relay signals from the plural gateway stations to the relay communication station, based on the selected calculation result of the weight of the combination pattern.

13. The relay communication station according to claim 9,
wherein the interference suppression section suppresses interferences between feeder links in plural reverse links for transmitting relay signals from the relay communication station to the plural gateway stations, based on the selected calculation result of the weight of the combination pattern.

14. An aerial-staying type communication relay apparatus comprising the relay communication station according to claim 9.

15. The relay communication station according to claim 10,
wherein, with respect to each of the plural combination patterns, the interference suppression section estimates propagation path responses between the plural antennas for feeder link and the plural gateway stations based on reception results of plural pilot signals transmitted and received between the plural antennas for feeder link and the plural gateway stations, and calculates plural weights respectively corresponding to the plural gateway stations based on the plural propagation path responses.

16. The relay communication station according to claim 10,
wherein the interference suppression section suppresses interferences between feeder links in plural forward links for transmitting relay signals from the plural gateway stations to the relay communication station, based on the selected calculation result of the weight of the combination pattern.

17. The relay communication station according to claim 10,
wherein the interference suppression section suppresses interferences between feeder links in plural reverse links for transmitting relay signals from the relay communication station to the plural gateway stations, based on the selected calculation result of the weight of the combination pattern.

18. An aerial-staying type communication relay apparatus comprising the relay communication station according to claim 10.

19. An interference suppression method of feeder links between a relay communication station that is incorporated in an aerial-staying type communication relay apparatus and relays a radio communication of a terminal apparatus, and plural gateway stations that are time-synchronized with each other and transmit and receive relay signals different from each other at a same frequency, the interference suppression method comprising:
calculating a weight for suppressing an interference between feeder links with respect to each of plural combination patterns of the plural antennas for feeder link of the aerial-staying type communication relay apparatus and the plural gateway stations, and storing plural calculation results of weight tables for the plural combination patterns, each weight table including plural weight for each of the plural combination pattern;

selecting a calculation result of one of the weight tables for the combination pattern from the plural calculation results of the weight tables for the plural combination patterns, when the combination of the plural antennas for feeder link and the plural gateway stations changes due to at least one of the rotation and movement of the aerial-staying type communication relay apparatus, the selected calculation result of the one of the weight tables for the combination pattern corresponding to the combination of the plural antennas for feeder link and the plural gateway stations after changing; and suppressing an interference between feeder links when transmitting and receiving relay signals between the relay communication station and the plural gateway stations based on the selected calculation result of the weight of the combination pattern.

20. A non-transitory computer readable storage medium containing software that is executed by a computer or processor provided in a relay communication station that is incorporated in an aerial-staying type communication relay apparatus and relays a radio communication of a terminal apparatus, the software comprising:

executable code that calculates a weight for suppressing an interference between feeder links with respect to each of plural combination patterns of the plural antennas for feeder link of the aerial-staying type communication relay apparatus and the plural gateway stations, and stores plural calculation results of weight tables for the plural combination patterns, each weight table including plural weight for each of the plural combination pattern;

executable code that selects a calculation result of one of the weight tables for the combination pattern from the calculation results of the weights of the plural combination patterns, when the combination of the plural antennas for feeder link and the plural gateway stations changes due to at least one of the rotation and movement of the aerial-staying type communication relay apparatus, the selected calculation result of the one of the weight tables for the combination pattern corresponding to the combination of the plural antennas for feeder link and the plural gateway stations after changing; and executable code that suppresses an interference between feeder links when transmitting and receiving relay signals between the relay communication station and the plural gateway stations based on the selected calculation result of the weight of the combination pattern.

* * * * *